Feb. 8, 1949.  A. H. DICKINSON  2,461,412
ACCOUNTING APPARATUS

Filed March 17, 1945  19 Sheets-Sheet 1

INVENTOR
Arthur H. Dickinson
BY
ATTORNEY

Feb. 8, 1949. A. H. DICKINSON 2,461,412
ACCOUNTING APPARATUS
Filed March 17, 1945 19 Sheets-Sheet 2
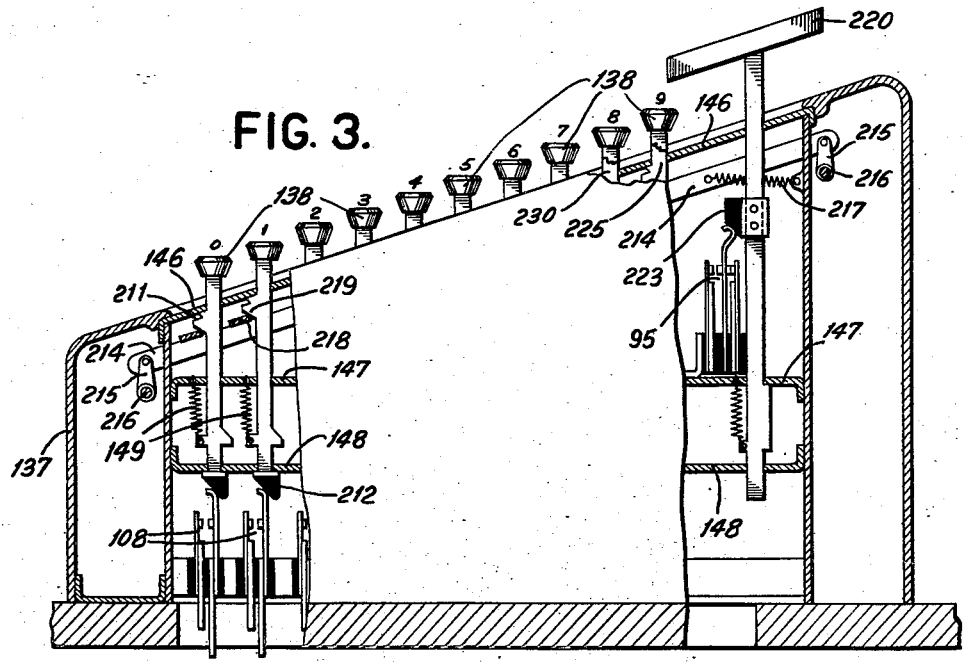
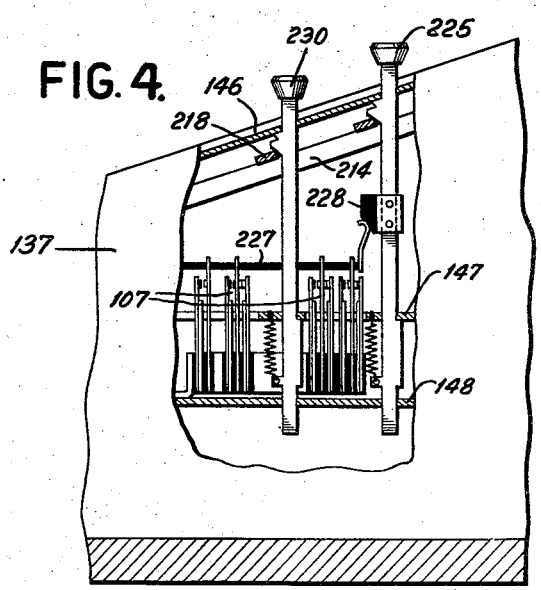

Feb. 8, 1949.  A. H. DICKINSON  2,461,412
ACCOUNTING APPARATUS
Filed March 17, 1945  19 Sheets-Sheet 3
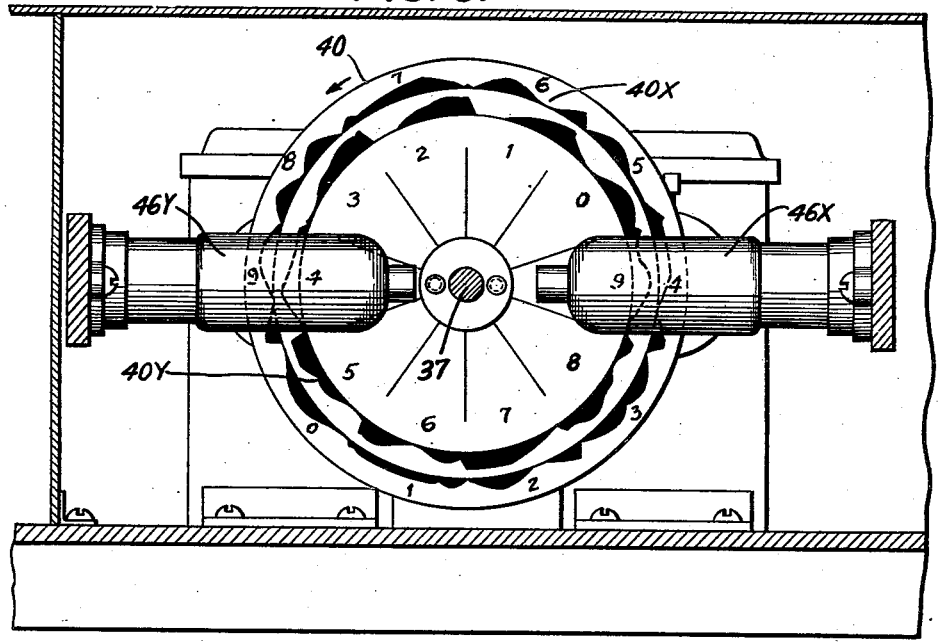
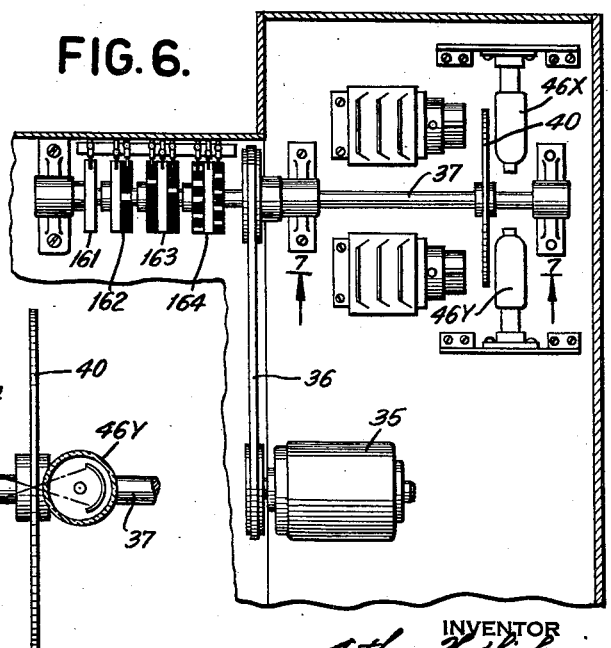
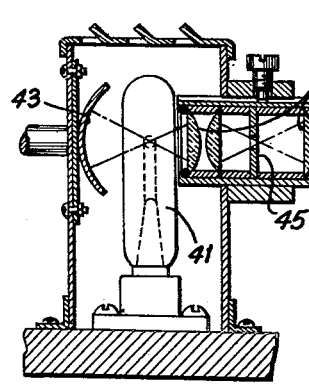
INVENTOR
Arthur H. Dickinson
BY
W. M. Wilson
ATTORNEY

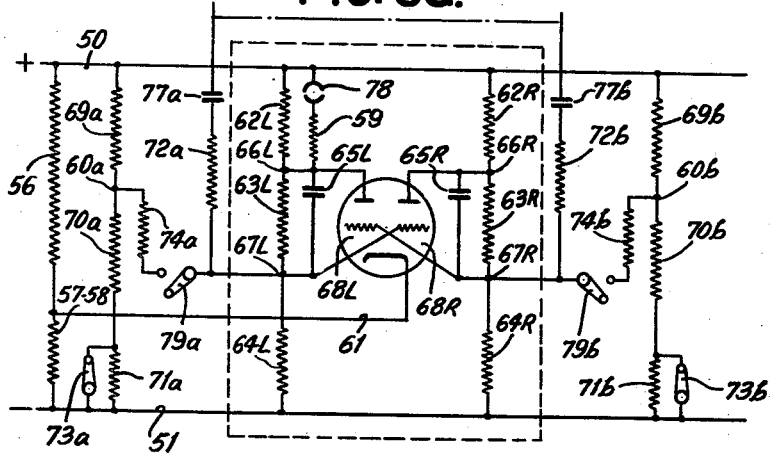

FIG. 8a.

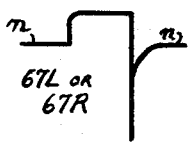

R – INDICATES POINTS 66R & 67R
L – INDICATES POINTS 66L & 67L
> INDICATES HIGHER VOLTAGE THAN

REGISTER UNITS

| DIGITS | A6-1 | | A7-2 | | A8-3 | | A9-4 | | A0-5 | |
|---|---|---|---|---|---|---|---|---|---|---|
| 0 | OFF | L>R | OFF | L>R | OFF | L>R | OFF | L>R | OFF | L>R |
| 1 | ON  | R>L | OFF | L>R | OFF | L>R | OFF | L>R | OFF | L>R |
| 2 | ON  | R>L | ON  | R>L | OFF | L>R | OFF | L>R | OFF | L>R |
| 3 | ON  | R>L | ON  | R>L | ON  | R>L | OFF | L>R | OFF | L>R |
| 4 | ON  | R>L | ON  | R>L | ON  | R>L | ON  | R>L | OFF | L>R |
| 5 | ON  | R>L | ON  | R>L | ON  | R>L | ON  | R>L | ON  | R>L |
| 6 | OFF | L>R | ON  | R>L | ON  | R>L | ON  | R>L | ON  | R>L |
| 7 | OFF | L>R | OFF | L>R | ON  | R>L | ON  | R>L | ON  | R>L |
| 8 | OFF | L>R | OFF | L>R | OFF | L>R | ON  | R>L | ON  | R>L |
| 9 | OFF | L>R | OFF | L>R | OFF | L>R | OFF | L>R | ON  | R>L |

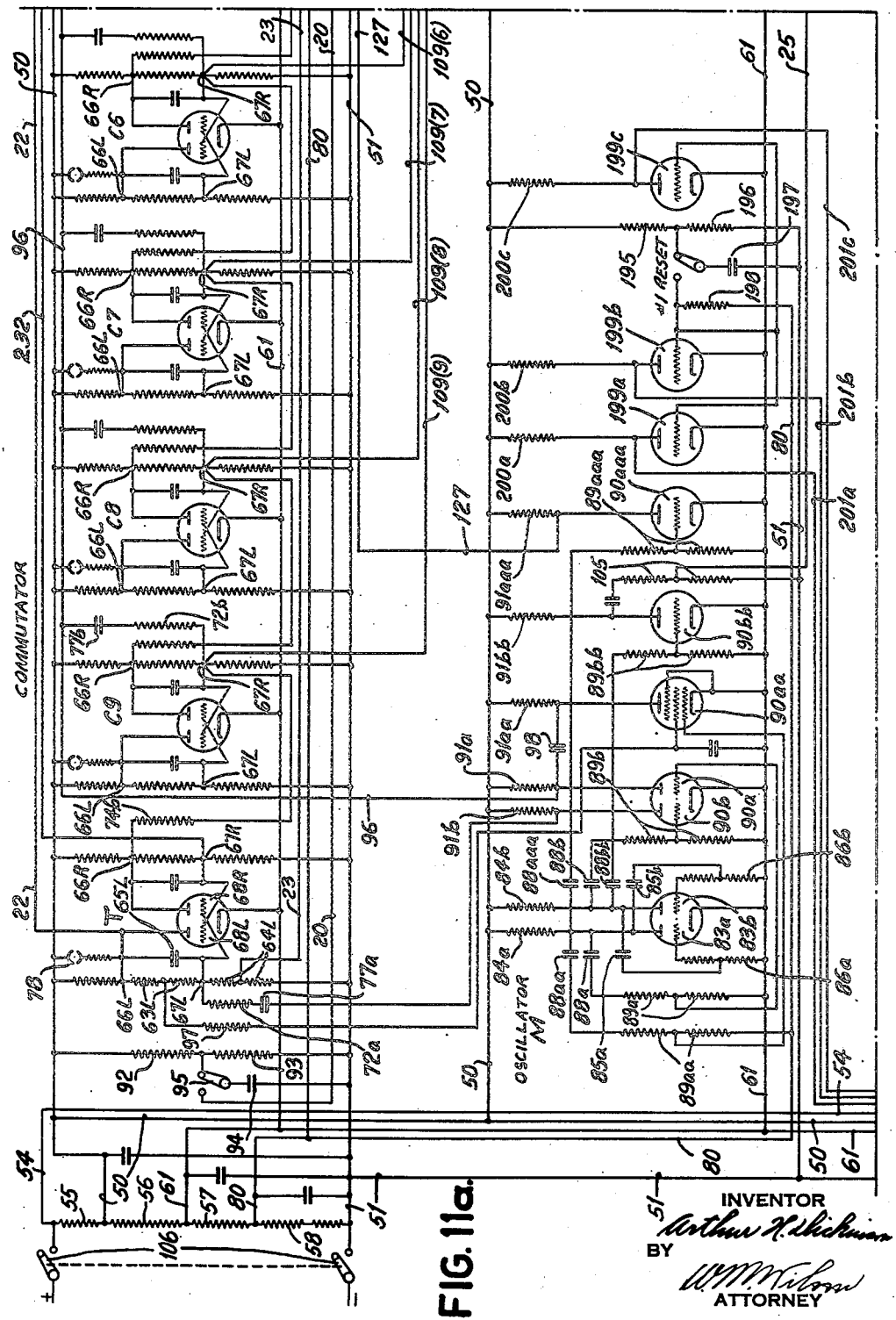

Feb. 8, 1949.　　　A. H. DICKINSON　　　2,461,412
ACCOUNTING APPARATUS
Filed March 17, 1945　　　19 Sheets-Sheet 7

INVENTOR
Arthur H. Dickinson
BY
ATTORNEY

Feb. 8, 1949. A. H. DICKINSON 2,461,412
ACCOUNTING APPARATUS
Filed March 17, 1945 19 Sheets-Sheet 9

INVENTOR
Arthur H. Dickinson
BY
ATTORNEY

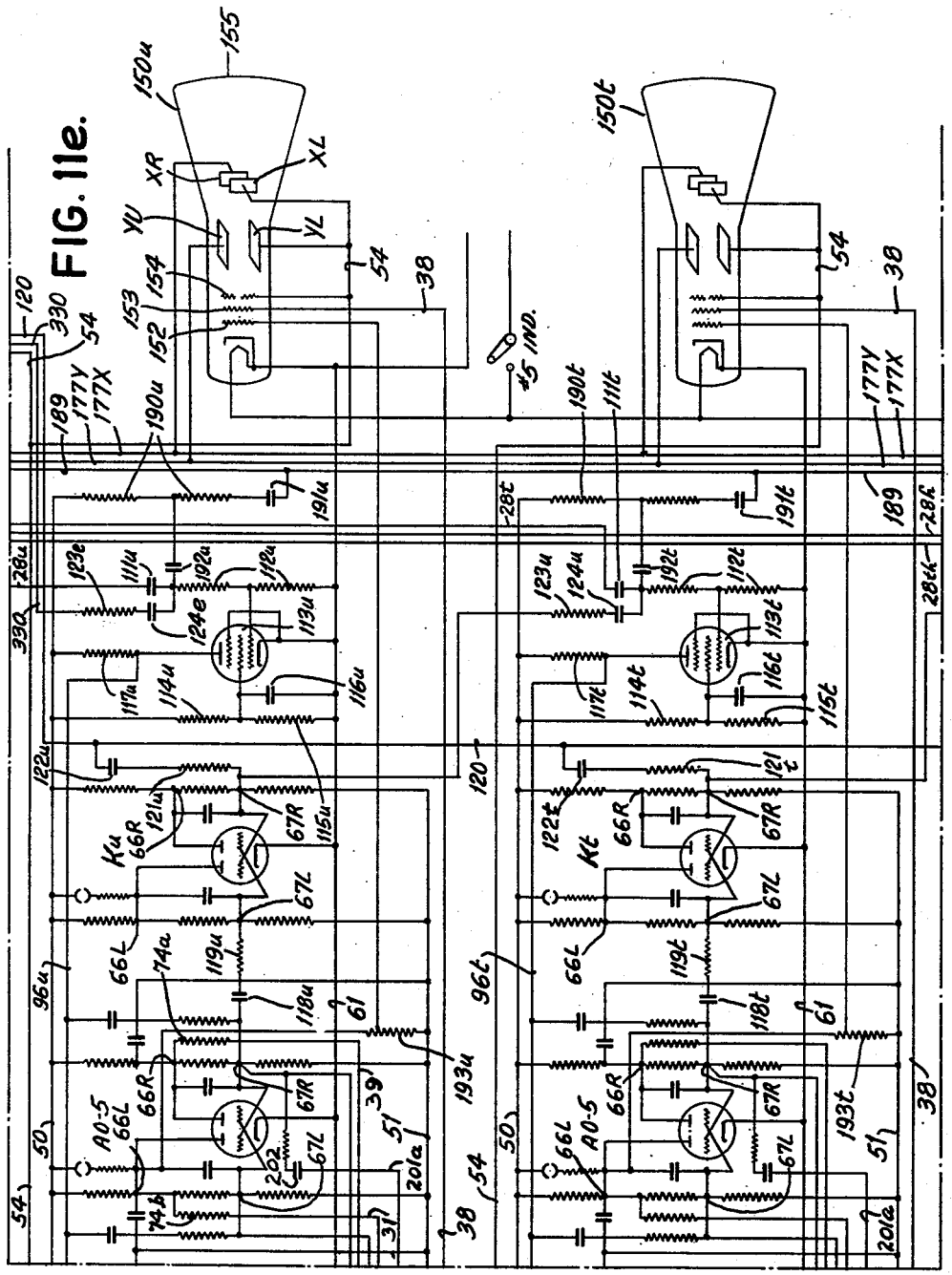

Feb. 8, 1949.  A. H. DICKINSON  2,461,412
ACCOUNTING APPARATUS
Filed March 17, 1945  19 Sheets-Sheet 11
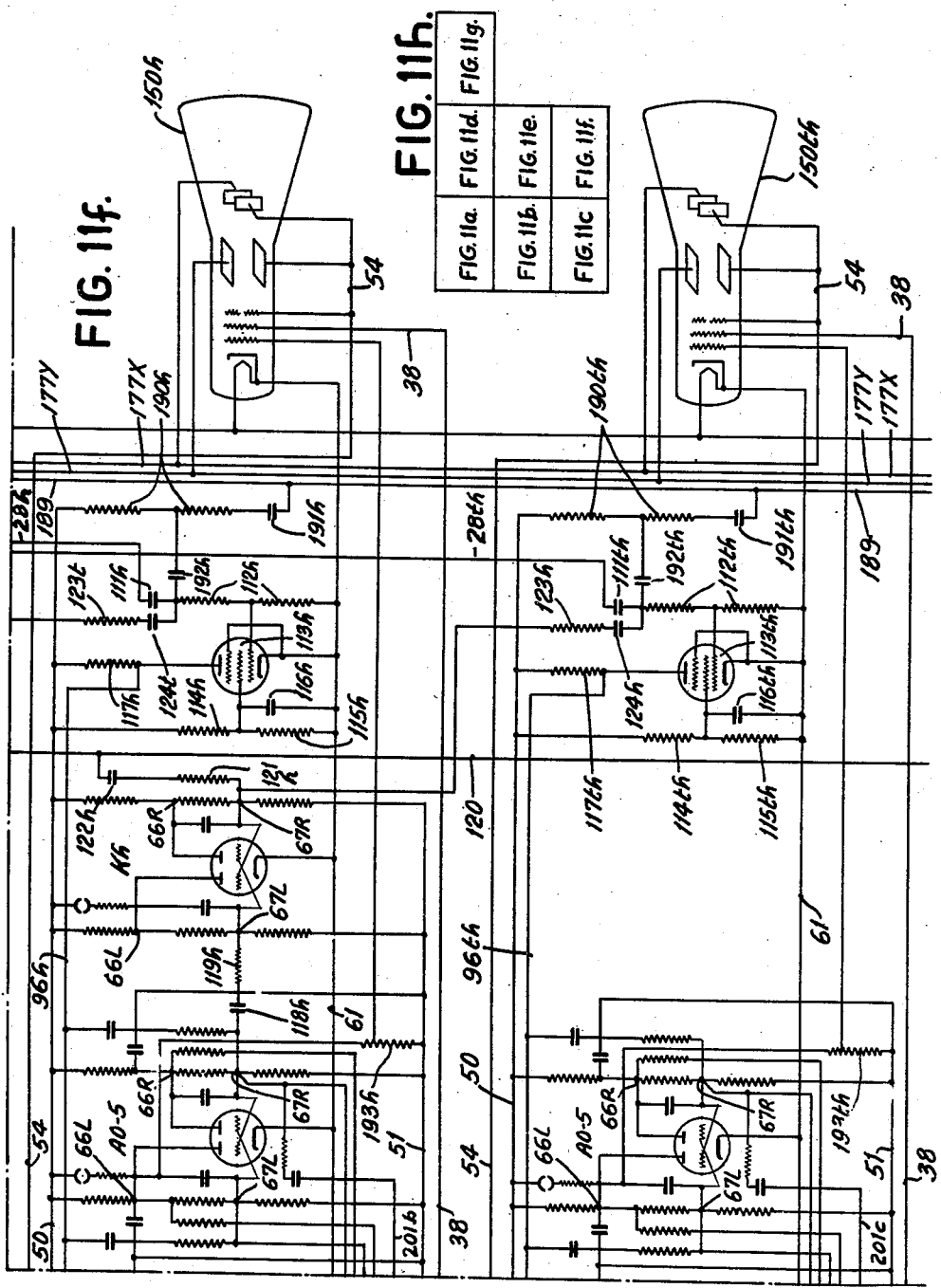

Feb. 8, 1949.  A. H. DICKINSON  2,461,412
ACCOUNTING APPARATUS
Filed March 17, 1945  19 Sheets-Sheet 14

Feb. 8, 1949.  A. H. DICKINSON  2,461,412
ACCOUNTING APPARATUS
Filed March 17, 1945  19 Sheets-Sheet 15
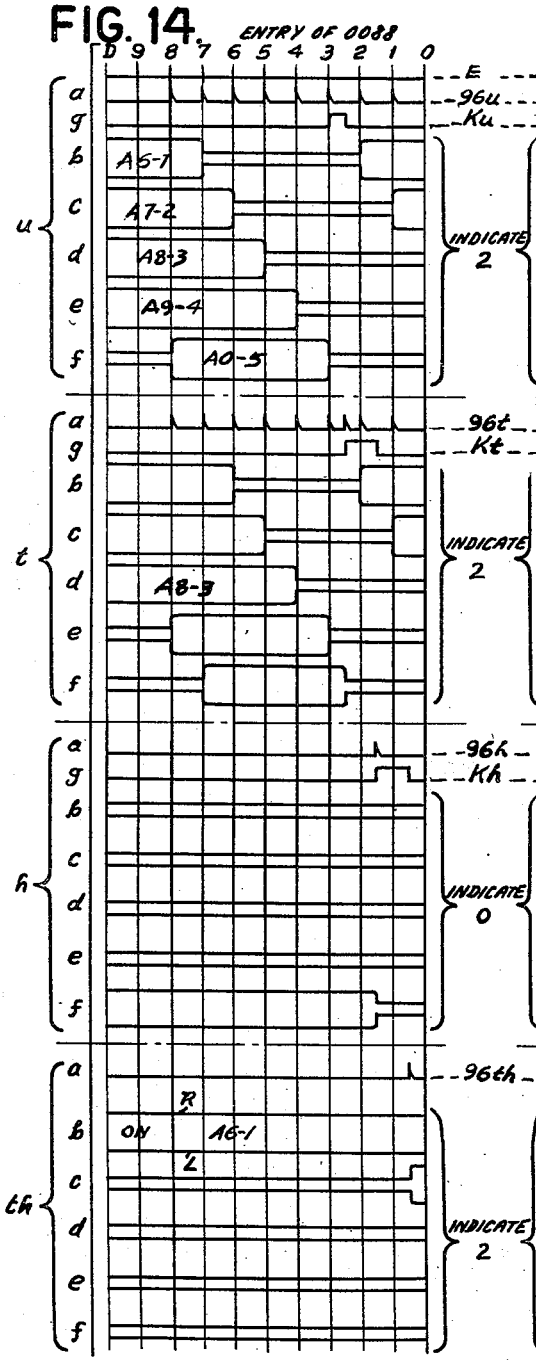
FIG. 14. ENTRY OF 0088
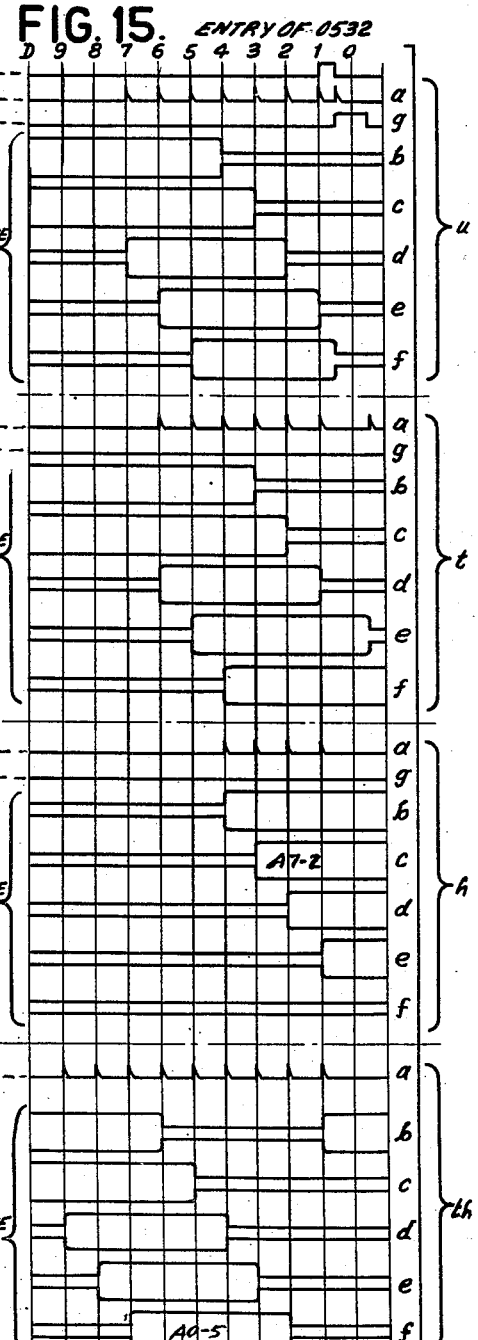
FIG. 15. ENTRY OF 0532
INVENTOR
Arthur H. Dickinson
BY
ATTORNEY Feb. 8, 1949.  A. H. DICKINSON  2,461,412
ACCOUNTING APPARATUS Filed March 17, 1945  19 Sheets-Sheet 16

Patented Feb. 8, 1949

2,461,412

UNITED STATES PATENT OFFICE 2,461,412

ACCOUNTING APPARATUS

Arthur H. Dickinson, Greenwich, Conn., assignor to International Business Machines Corporation, New York, N. Y., a corporation of New York Original application December 27, 1943, Serial No. 515,719. Divided and this application March 17, 1945, Serial No. 583,274

13 Claims. (Cl. 177—337)

This application is a division of my application Serial No. 515,719, filed December 27, 1943, and is directed to a novel electronic value totalizing and value manifesting apparatus. The general object of the invention is to provide an apparatus better and simpler than those disclosed in my former applications of which particular note is to be taken of application Serial No. 394,883, filed May 23, 1941, and now Patent No. 2,402,989.

The latter application disclosed totaling apparatus in which chosen entries were made in electronic entry receiving and totaling orders by operating them for differential times of an entry cycle. Each order included a plurality of electronic trigger circuits for combinationally manifesting different digits of a notation. These circuits were connected for progressive value registering operation in response to successive entry pulses. As many entry pulses were applied as the number of value increments in the digit to be entered; e. g., digit 9 was entered by applying nine entry pulses. The entry pulses were produced by electronic means which was rendered effective for a differential part of the cycle to respond to continuously applied oscillator pulses. For rendering the entry pulsing means effective, an entry controlling trigger circuit was tripped from one status to another and back again by pulses derived from a continuously operating electronic commutator. Prior to an entry, a chosen value setting was made of value selecting means. Then a single entry cycle means was brought into operation to establish a delimited cycle during which a number of the continuously produced commutator pulses had differential time relationship. Two of the commutator pulses were transmitted to the entry controlling trigger circuit, the first pulse tripping it on to render the entry pulsing means effective and the second tripping it off to stop the entry pulsing operation. When a positive amount was chosen for entry in an order, the value setting transmitted the first pulse at a differential time, starting the entry pulsing operation. At a fixed time of the cycle, a second commutator pulse was fed to the entry control trigger circuit and interrupted the entry pulsing operation. The two commutator pulses were separated by a differential cyclic time which permitted the entry means to produce a number of pulses equal to the value selected for entry in the order. When a negative amount was to be entered, subtraction control means was brought into operation. During a subsequent entry cycle established by the single entry cycle means, a commutator pulse was fed to the entry control trigger circuit at a fixed time of the cycle to initiate entry pulsing. At a differential time selected by the value setting, a second commutator pulse was applied to the entry control trigger circuit and terminated entry pulsing. The result was the production of a number of entry pulses equal to the complement of the value chosen for subtractive entry. Elusive one means was operated under control of a commutator pulse at a fixed time of the cycle, during a subtractive entry. Carry means were provided between adjacent orders of the value manifesting units. The carry means between two orders was pulsed in synchonism with the entry pulsing of the lower of the two orders. When such lower order attained a 9 value status, it prepared the carry means to operate in response to the next carry control pulse. Collaterally with the entry pulsing of the lower order to advance it from 9 to 0 value status, a carry control pulse operated the carry means which acted through other than the regular entry means of the next order to enter a carry value therein. Special carry through carry means was provided to produce a carry entry in a second higher order when the first higher order was in 9 value status at the time it received a carry entry from its preceding order. The totals standing in the accumulator orders were indicated in digit outline form by cathode ray tubes. Control of each cathode ray tube was effected by a related order of the value totaling means through a plurality of electronic relays. Each relay was selectively operated under control of a combinational read-out circuit established by a composite digit manifesting pattern of the electronic value manifesting means of the order. When a particular digit was manifested, an electronic relay was operated and enabled the cathode ray tube to display the particular digit, the tracing of which was under control of a pattern emitter.

The above outline of the apparatus disclosed in my prior application, Serial No. 394,883, now Patent No. 2,402,989, will aid in an appreciation of some of the objects which are stated below.

These objects are as follows:

To provide novel electronic total registering and indicating apparatus.

To provide a novel method and means for reading out and manifesting digits standing in an electronic value registering means.

To provide, in a novel manner, for a substantially continuous character outline indication of cumulative values in electronic value totaling and registering orders.

To provide for cathode ray means to display a regular digit selected under direct control of the electronic value registering means.

To effect continually repetitive selection, by electronic value registering means, of the character outline to be indicated.

To effect repetitive operations, in a cyclic manner, of a chain of electron value registering means for repeatedly reading out a value.

To suspend cyclic advancement of the value registering means during totaling periods, in which a desired value shall be entered.

To operate the value registering means at one rate to receive entries during such totaling periods and at a differenet rate during repetitive digit selecting periods.

To effect a cycle of operations of a series of electronic value registering units in order to control value readout and manifestation.

To operate electronic value registering means through different value-corresponding states or aspects and enable a particular value aspect to control character manifestation.

To repeatedly operate the electronic means in successive cycles through all its value aspects, starting from the total value aspect and to enable the zero value aspect to control manifestation of the total value.

To effect cycles of value progressing operation of an order of electronic devices so that, depending on their initial value status, a particular value status shall occur at a differential cycle time and by reason of its differentially timed occurrence shall control manifestation of the initial value.

To continually enter fixed values in each order of value registering devices during each of continuously occurring indicating cycles.

To superimpose selected entries upon the fixed entries, such selected entry to be made during a totaling period which lies within an indicating cycle.

To so time the totaling period with respect to the indicating period in an indicating cycle that the selected entry shall be completed before the indicating period begins.

To define the totaling period under control of indicating cycle means.

To so coordinate operation of the electronic value registering means to the character manifesting means that for each increment of operation of the registering means, the manifesting means shall be prepared to manifest a particular character.

To provide, as character manifesting means, indicating means in which elements operating at indicating cyclic timing are capable of controlling the tracing of different characters on a cathode ray tube screen and to synchronize the operation of such trace controlling means with the operation of the value registering means in the indicating cycle.

To provide a pattern emitter which has different digit tracing control portions in control at different indicating cyclic times and to advance the value status of the value registering means in synchronous relation to the times at which the different tracing control portions are in control.

To so synchronize operation of the pattern emitter and the value registering means that a particular digit tracing control portion of the emitter shall be in control when a particular value advance of the registering means has been effected.

To so synchronize operation of the pattern emitter and the value registering means that the zero value status of an order of the registering means and the emitter portion, pertaining to the digit initially in the order, concurrently are in joint control of the related order cathode ray tube to cause the initial digit to be traced and visibly manifested.

To suppress carry operation during the continual, cyclic operation of the value registering means.

To suppress elusive one entry during such cyclic operation of the value registering means.

To reduce the number of steps of operation of the registering means effected in the indicating cycle directly preceding a totaling period so as to compensate for a step of advance of each order of the registering means occurring as a result of the change to totaling operation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a partly sectional view along line 3—3 of Fig. 2.

Fig. 4 is a partly sectional view along line 4—4 of Fig. 2.

Fig. 5 is a face view of the pattern emitter disk and part of the scanning means.

Fig. 6 is a plan section through the base housing of the machine, looking down on elements of the indicating apparauts.

Fig. 7 is a section on line 7—7 of Fig. 6.

Fig. 8a shows a trigger circuit used in the invention.

Fig. 8b graphically shows voltage conditions produced at either of two similar points of the trigger circuit.

Fig. 8c similarly shows voltage conditions produced at either of two other similar points of the trigger circuit.

Fig. 9 is a table showing the values corresponding to different combinational patterns of electronic and electrical conditions in the units of a value registering order.

Figure 10:
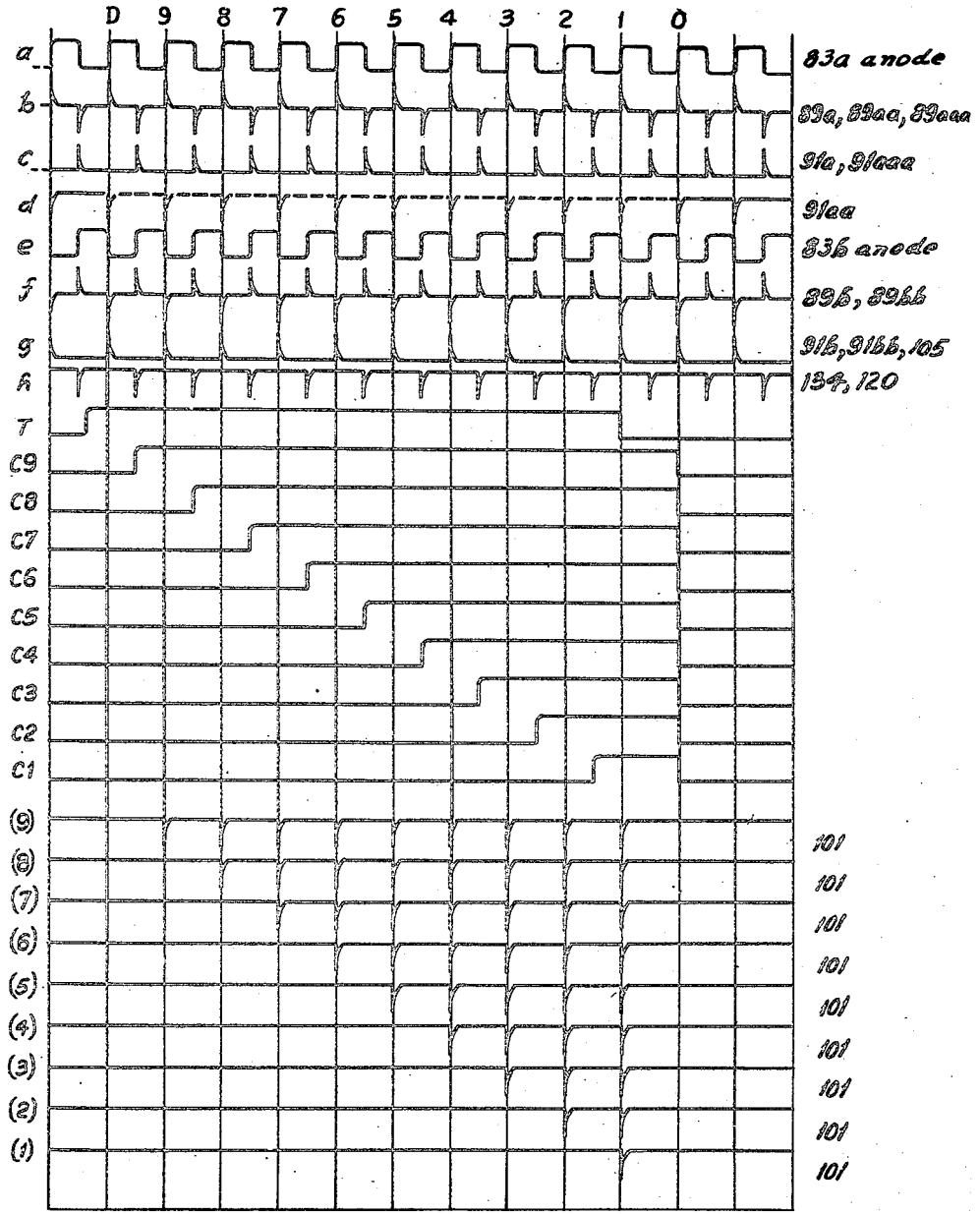

Fig. 10 shows the timing of certain oscillator pulses, also of units of the commutator, and of groups of entry control pulses.

Figs. 11a to 11g constitute the main circuit diagram.

Figure 11B:
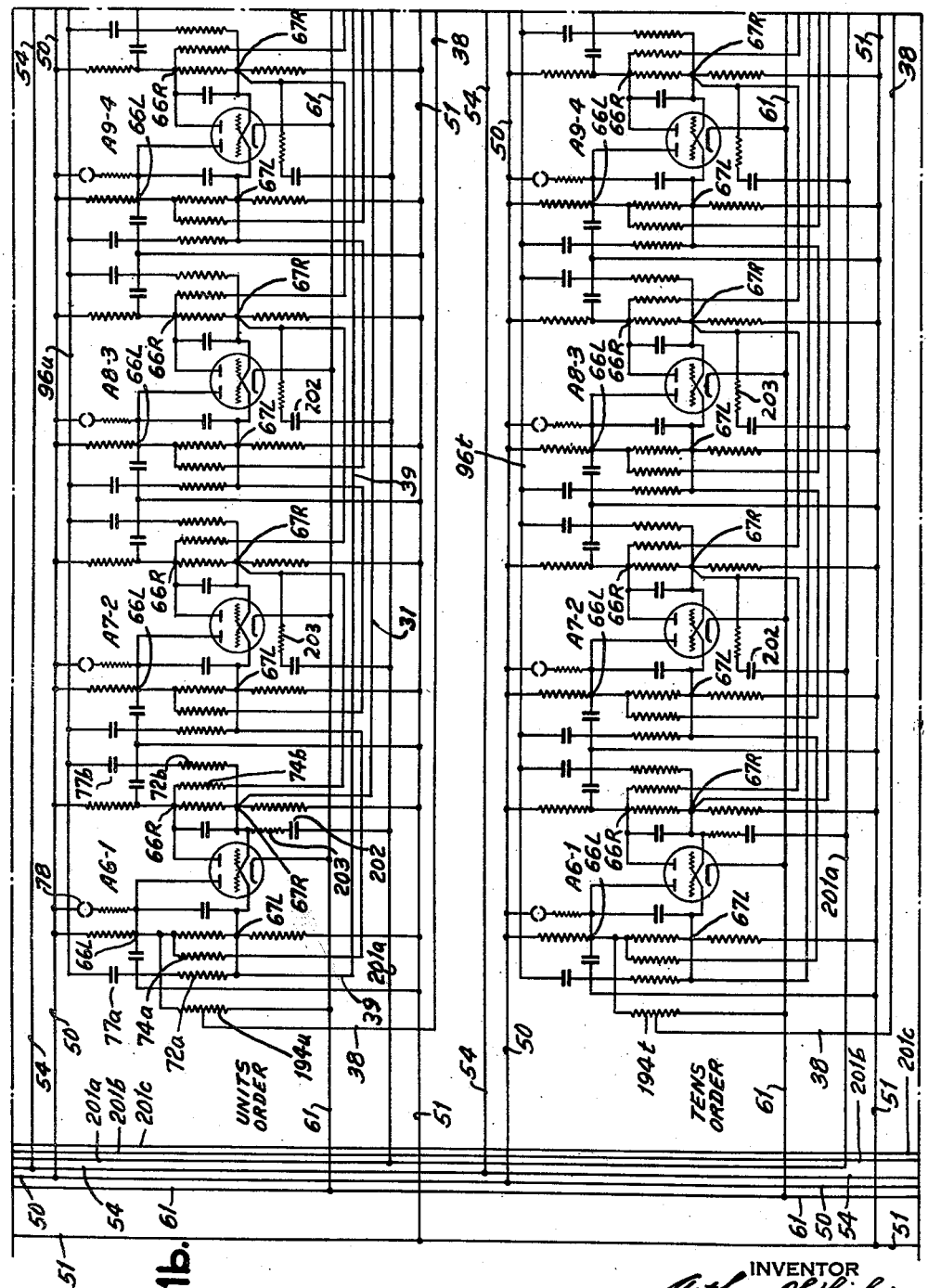
Figure 11C:
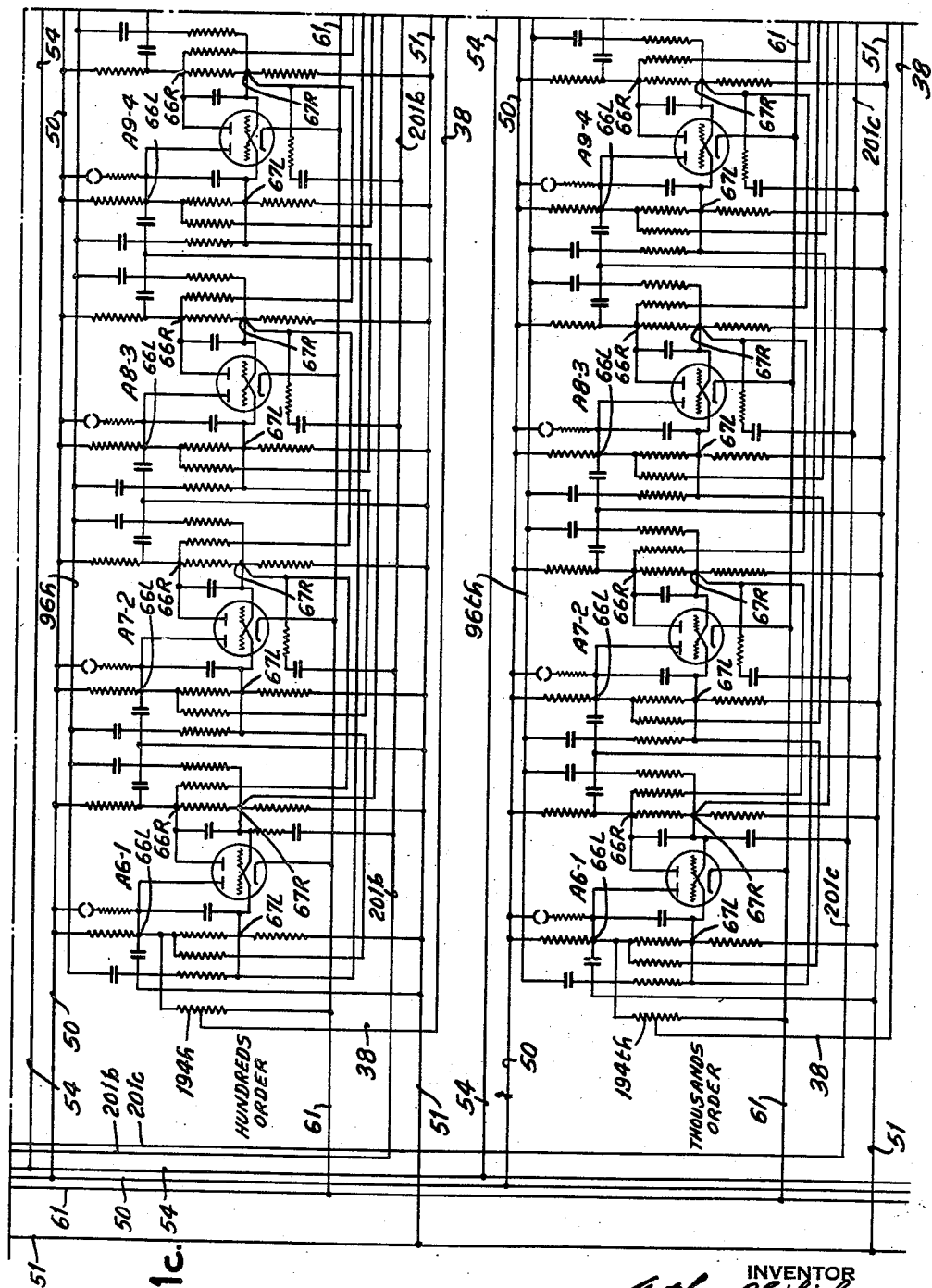

Fig. 11h indicates the positional relation of the circuit figures Figs. 11a to 11g.

Figure 11D:
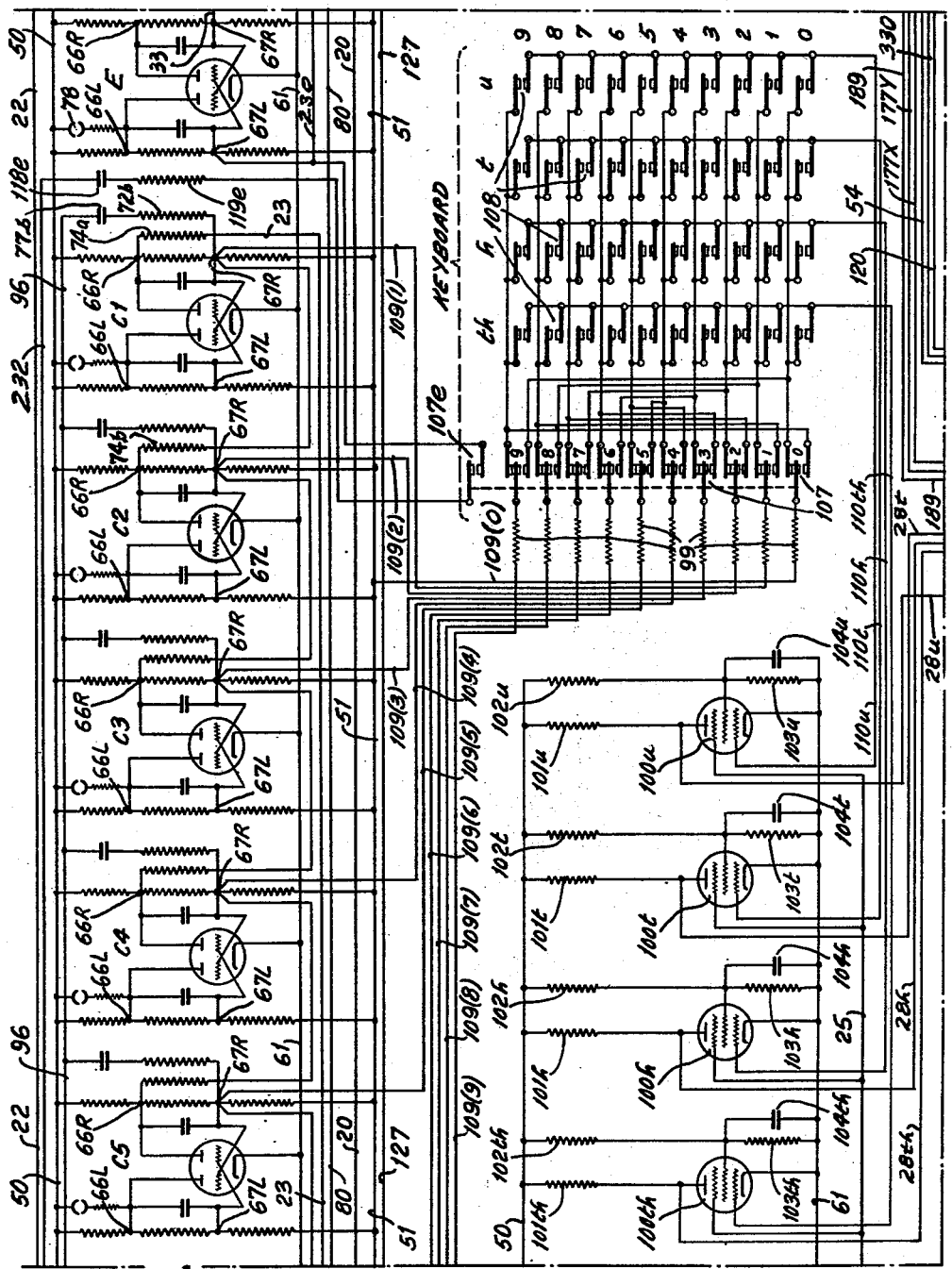
Figure 11G:
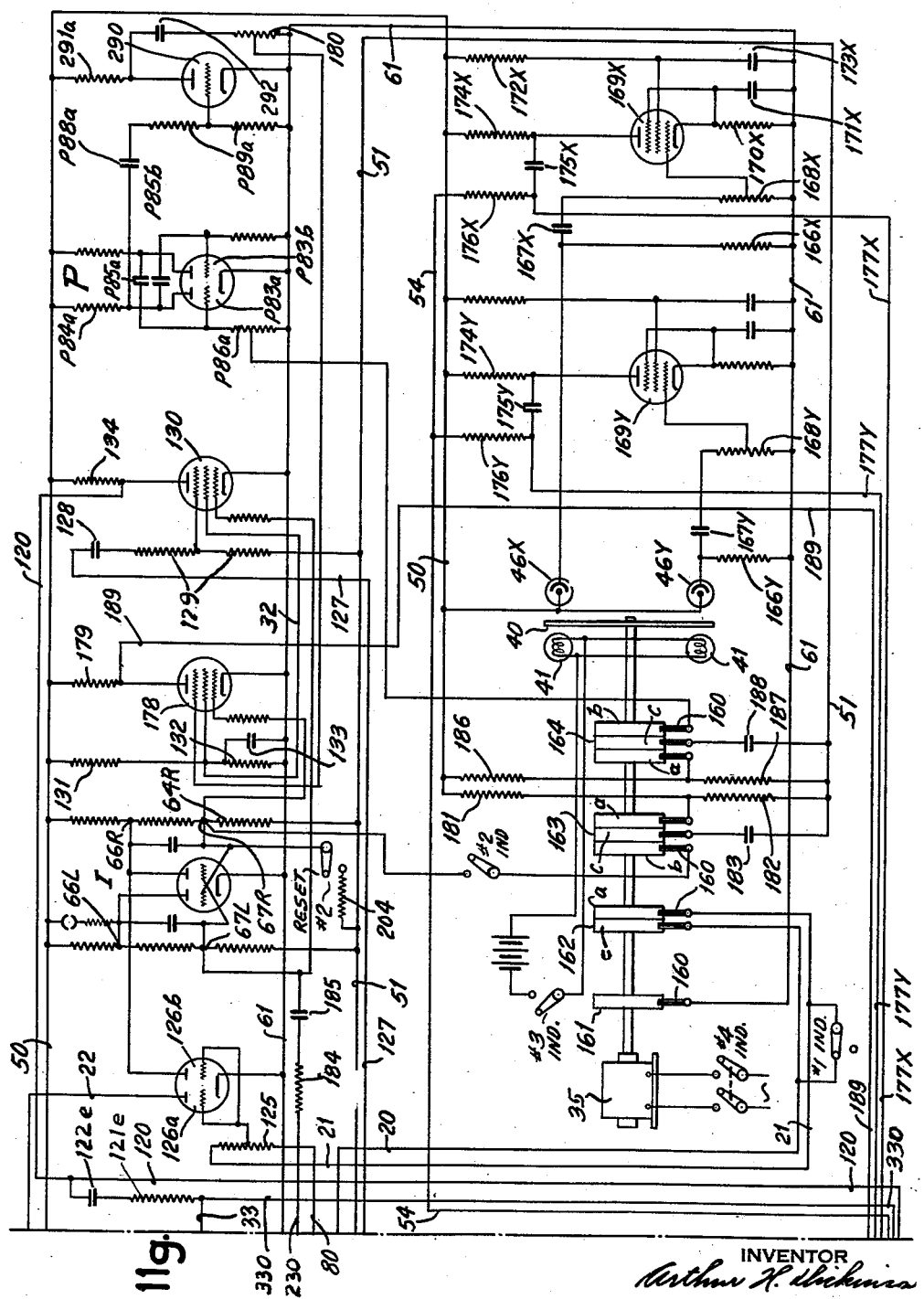
Figure 11A:
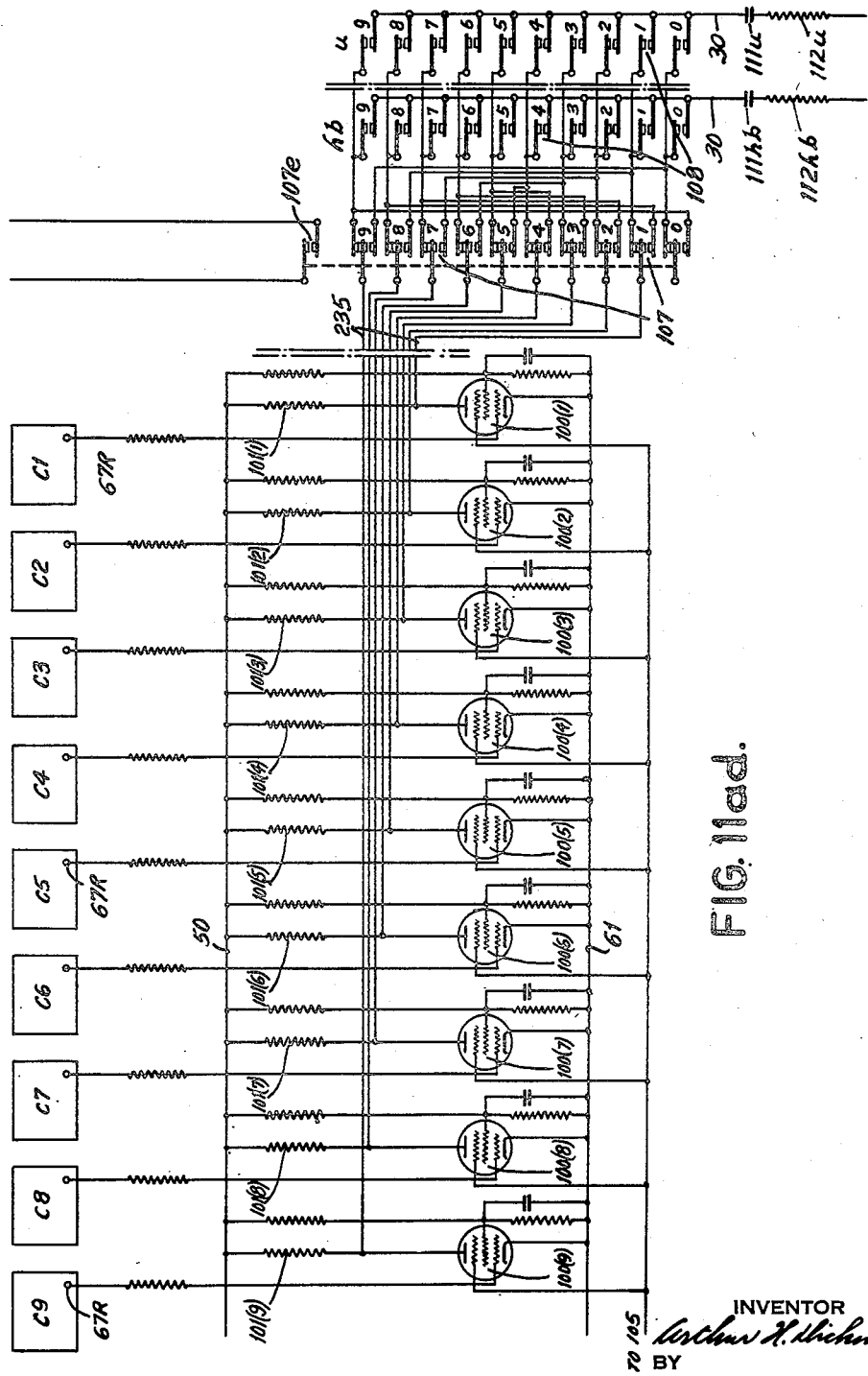

Fig. 11ad is a circuit diagram of a modification of the entry control pulse producing means.

Figure 12:
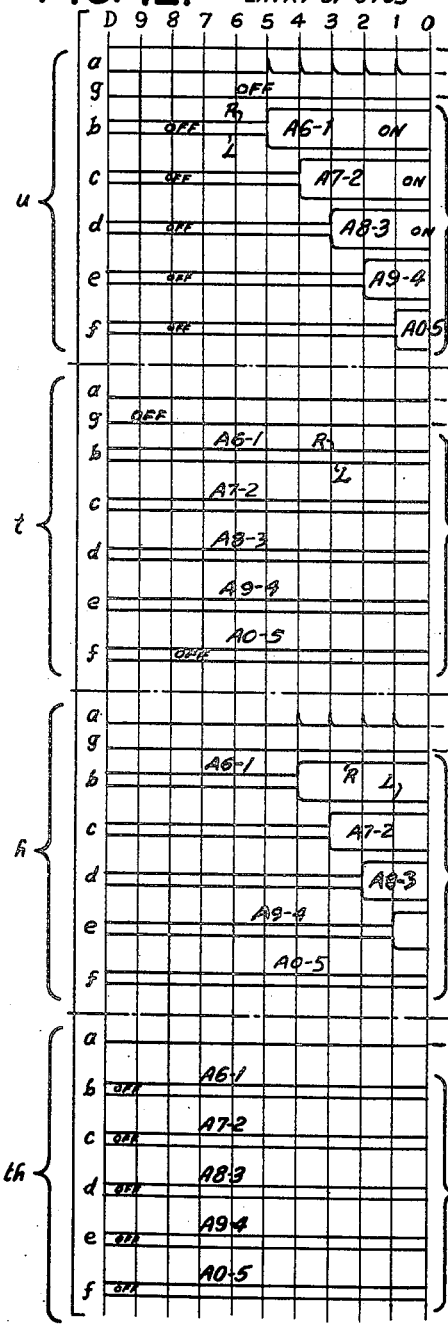

Fig. 12 is a time chart relating to a first entry in the totaling orders.

Figure 13:
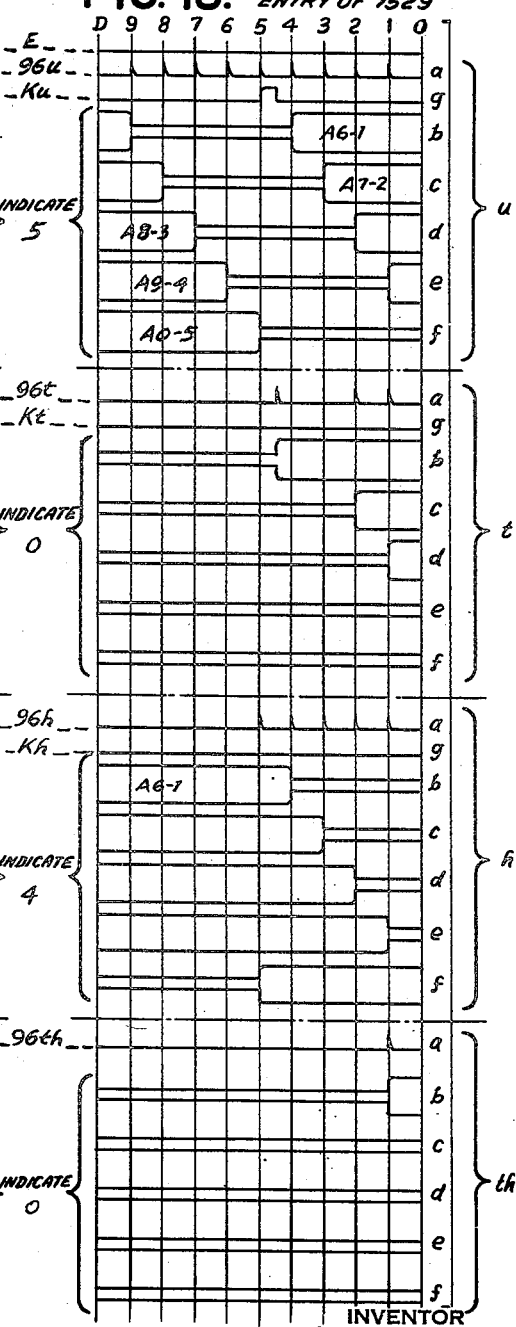

Fig. 13 is a similar chart relating to a second entry.

Fig. 14 similarly shows the timing of a third entry.

Fig. 15 shows the timing of a fourth entry.

Figs. 16a, 16b, 16c, and 16d illustrate several indicating cycles.

Figure 16A:
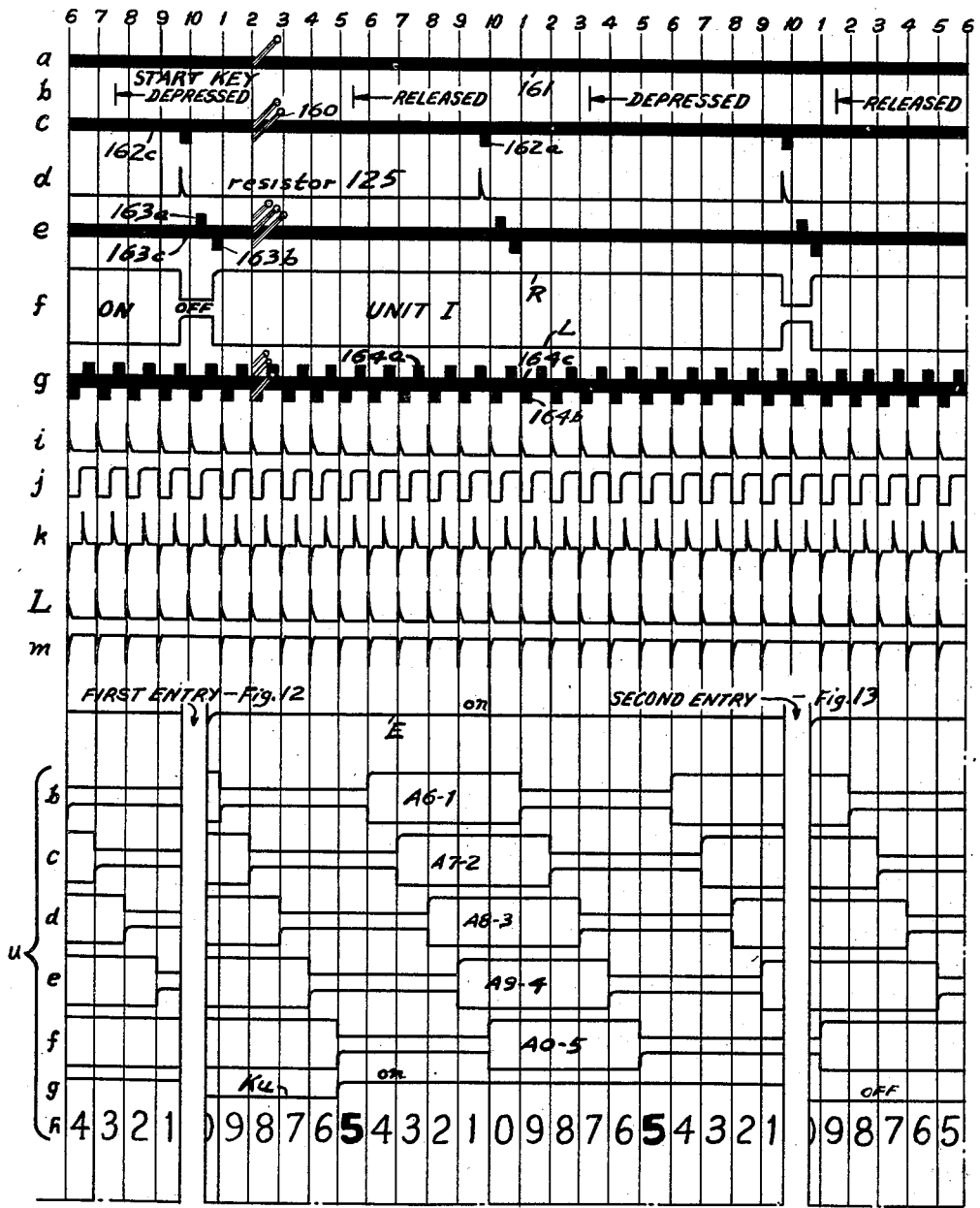
Figure 16B:
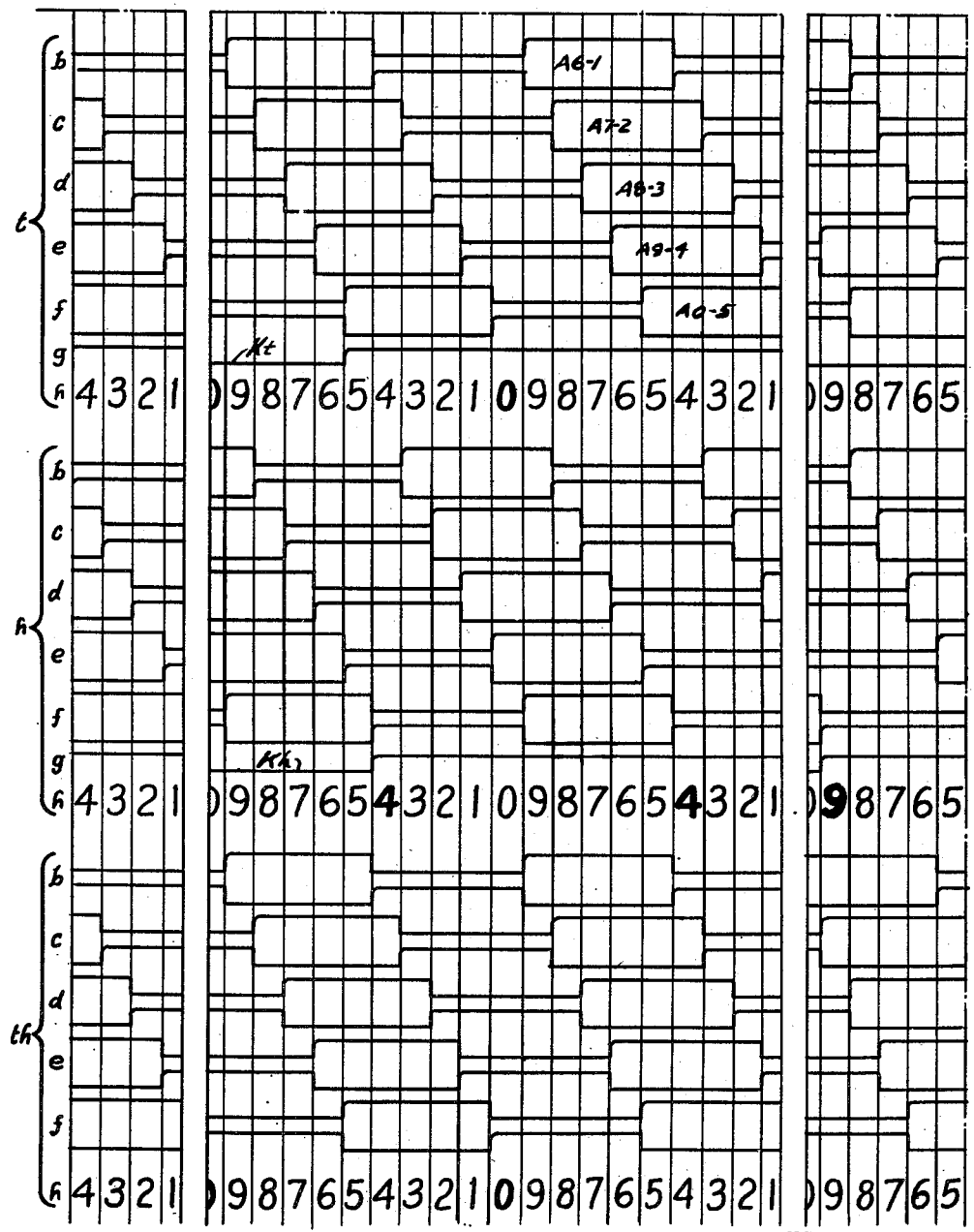
Figure 16C:
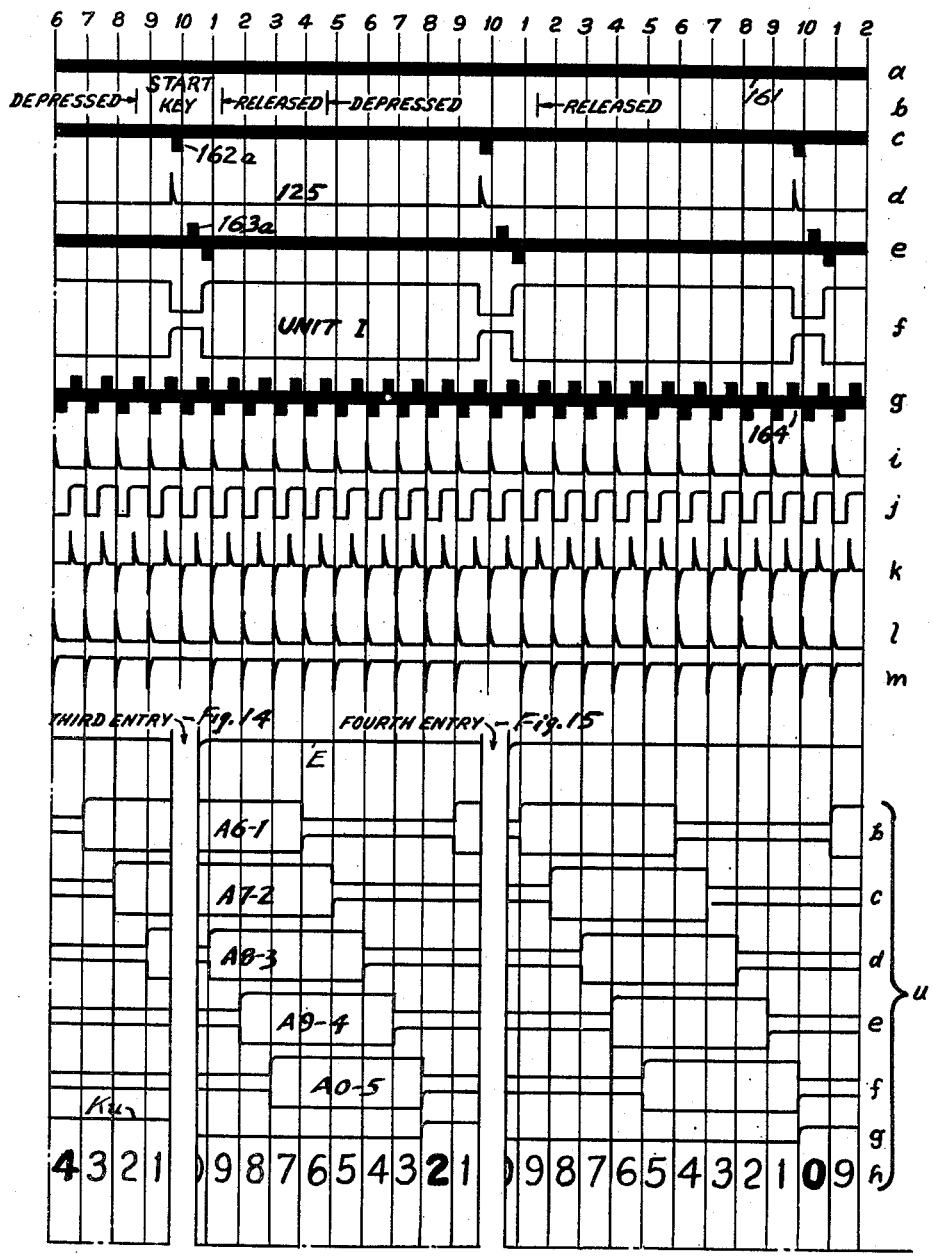
Figures 16D, 17:
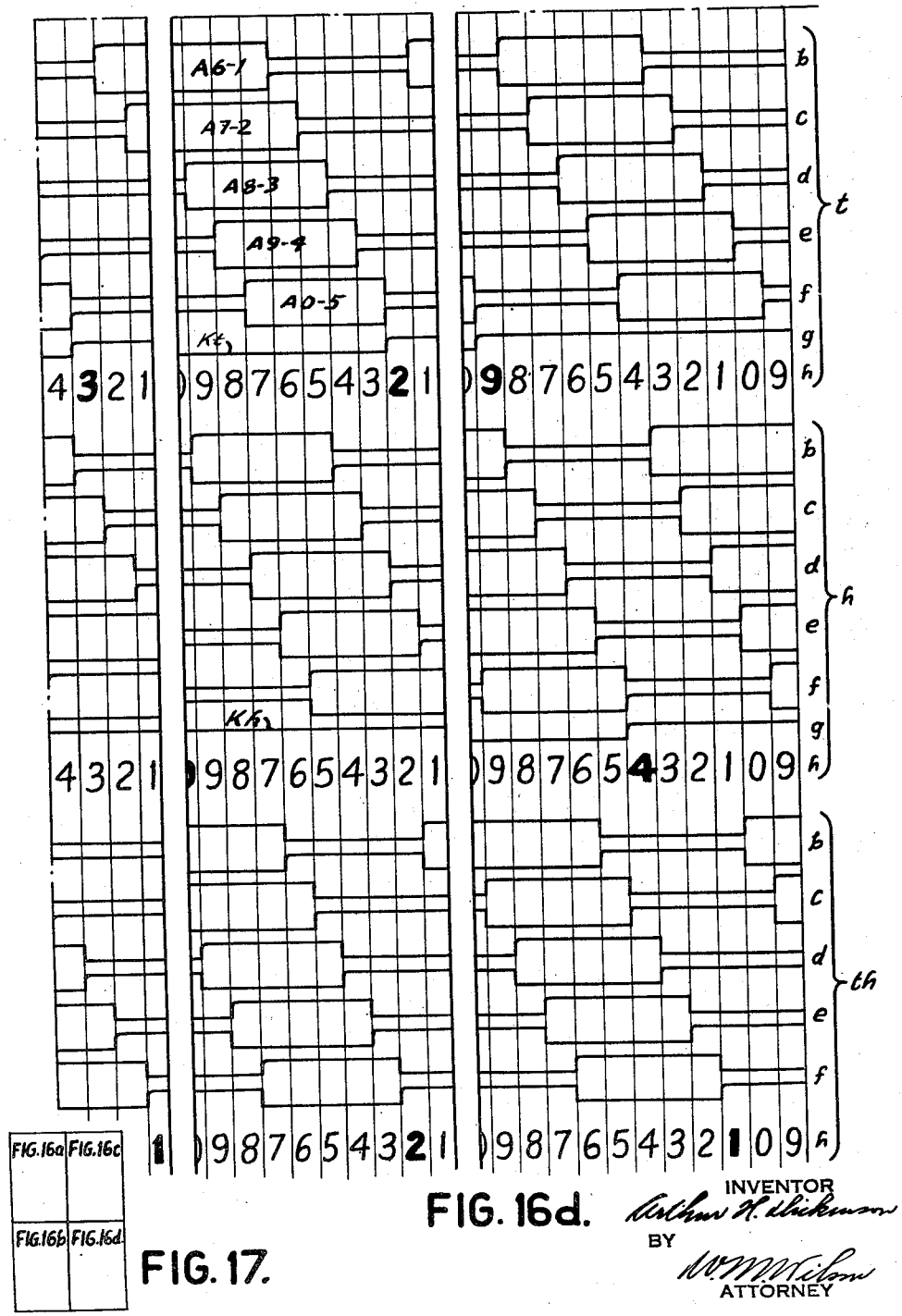

Fig. 17 is a diagram indicating the positional relation of Figs. 16a to 16d.

1. General description

The machine includes value selecting means. For simplicity of disclosure, a keyboard apparatus is used as the value selecting means, but it will be understood that other means, for instance, record controlled means, could be used. Key contacts are closed according to the values chosen for entry.

A start-stop electronic commutator is provided. This is composed of a control unit and stopping units. Each unit is an electronic trigger circuit and they are connected in such manner that when one is tripped from an original to a reverse status, it prepares a following unit to be reversed in status. The tripping operations are effected by pulses derived from a main oscillator. The control unit, however, is reversed in status by a pulse from another source than the oscillator. This pulse may be applied to the control unit solely under manual start control when the machine is not set for indicating operation. When the machine is set for indicating, the pulse is applied to the control unit automatically at a predetermined cyclic time but only after a manual start operation has been performed. The control unit when reversed in status primes the first stepping unit to be reversed and thereafter the stepping units are sequentially reversed by pulses derived from the oscillator. The reversal of the last unit causes the control unit to be returned to original status which, in turn, causes all the stepping units to be restored to original status simultaneously, ending the commutator cycle. To start a new commutator cycle, another manual start operation must be effected. During the cycle, each stepping unit is in reverse status for a differential period of the cycle. In its reverse status, a stepping unit is capable of conditioning an electron tube to produce entry control pulses under control of pulses derived from the oscillator. The main embodiment has one such tube for each order and the tube is selectively connected to the stepping units through the value key contacts. The tube thereby becomes effective during the differential period of the cycle in which the connected stepping unit is in reverse status to produce a number of entry control pulses equal to the selected value. The entry control pulses are fed to pulse inverting means, which includes an electron tube, for inverting the entry control pulses into entry pulses of reverse polarity. The entry pulses appear on an input wire of the related order of the totaling means.

The totaling means, in each order, comprises a plurality of sequentially operable electron trigger circuits which are referred to, for convenience, as register units. Each entry pulse reverses the status of one of these units. The next entry pulse reverses the status of the next unit, and so on. There are a less number of such units in an order than the number of different digits to be registered thereby. They serve in combination, however, to register all the different digits selectively. Starting from a zero status, the application of as many entry pulses as the number of units in an order operates them all to a so-called on status. The next entry pulse turns off the first unit and when as many more such pulses are applied as the number of remaining units, they are all again in off status, which is the zero status. Thus, a number of entry pulses equal to twice the number of units in an order effects a complete cycle or sequence of operation of the units, in which they progressively register all the digits and at the end of which they are again in the initial value status. This is true whether the units are initially in 0 status or any other value status. Such cycle of the register units may be called a register cycle. When an order of register units advances from 9 to 0 value status, it turns on an electronic trigger circuit. A pulse derived from the oscillator then turns off this trigger circuit which thereupon acts through the pulse inverting tube of the next order to cause a carry entry pulse to appear on the input of this next order, advancing the register units of the latter order one value step. Such carry entry pulse appears between the times at which regular value entry pulses may appear, so that there is no possibility of one such pulse being lost in the other pulse, but each pulse will take individual effect. If the next order is advanced to zero status by the carry pulse, it causes a carry to occur to the still higher order when the next carry control pulse derived from the oscillator occurs. Thus, carry operations may occur in progressive steps from one order to the second to the third and so on. On the other hand, if all the orders, except the highest, are simultaneously in 9 status and each receives a regular value entry pulse at the same time, the carries from each order to the next occur simultaneously.

When a subtractive entry is to be made, a subtract key in the value selecting keyboard is operated. This inverts the connections between the value key contacts and the commutator stepping units in such manner that the entry control pulse producing means will produce in each order a number of entry control pulses which corresponds to the complement of the value selected for such order. These pulses will be converted to entry pulses and the orders of register units will be operated in the same way as for positive entries but for a complemental number of value steps. An elusive one means is provided. This elusive one means comprises an electronic trigger circuit which is turned on by the control unit of the commutator when the control unit is triggered back to its original status. A pulse derived from the oscillator then turns off the elusive one trigger circuit, causing it to apply an entry control pulse to the inverting means of the lowest order. This results in application of an elusive one entry pulse to the lowest order, which effects a step of value advance of the register units of the lowest order.

The machine includes character indicating means whereby values standing in the electronic totalizer may be manifested in conventional digit outline form. Such indicating means includes cathode ray tubes, one for each order, and a common pattern emitter. The pattern emitter controls the tracing of different digits on the screens of the tubes, but such tracing will be suppressed in each tube except for characters selected by the related orders of register units. The machine may operate to select and effect entries without regard to the indicating means. On the other hand, the machine may be set for indicating, in which case the entries of selected values will occur in timed relation to the indicating cycles. The totaling period; that is, the period in which a selected amount is to be entered, is a small fraction of the indicating cycle, so that, in terms of the indicating cycle, the selected entry may be said to occur practically instantaneously. At other times, the total will be indicated by the cathode ray tubes, so that it may be said that indication is substantially continuous. During an indicating cycle, entry pulses are derived from indicating cycle-controlled means and applied to each order of the totalizer. These pulses effect a complete cycle of value advance of each order of register units, stepping them through all the value states back to their initial value status. Means are provided to synchronize the steps of advance of the register units occurring in an indicating cycle with the scanning of different digit portions of a pattern emitter member. The relation between the steps of advance of the register units and the scanning of the emitter digit portions is established in such manner that for each step of advance of the register units, the pattern emitter portions relating to a chosen digit are in control of tube tracing. Thus, there is a direct correspondence between the digit initially standing in the order of the units and the digit emitter portions in tracing control at the time the order attains zero status in the indicating cycle. The zero status in an order of register units is here preferably utilized to enable the cathode ray tube for this order to direct an electron beam upon the fluorescent, display screen of the tube. Thus, the digit initially standing in the order will be traced and displayed at this time under joint control of the zero status of the register units and the emitter portions then in tracing control. The indicating cycles occur at such frequency and the persistence characteristics of the screens are such that the tubes appear to display the selected digits continuously. When an entry of a selected amount is to be made, application of entry pulses under control of the indicating cycle means is suspended. The electronic commutator is brought into operation for one commutator cycle and the selected entry then takes place, being completed within a totaling period which terminates prior to a predetermined point of the indicating cycle. The continuing operation of the indicating means results in display by the cathode ray tubes of the new total. During the indicating cycles, when the value register units of all the orders are stepped through complete sequences by entry pulses derived from indicating cycle means, the operation of the carry means and the elusive one means is suspended. The carry means and the elusive one means are of such nature that when a totaling period, for entry of a selecting value, is initiated, they operate to add one to each order of register units. To compensate for this additional step of advance of each order, one step of advance of the units of each order is omitted in the indicating cycle immediately preceding the totaling period.

The totaling orders may be reset to zero by manipulating certain reset switches to cause resetting pulses to be applied to all the register units.

Certain terms used herein are explained below.

A register order is said to register a value when it is in condition representative of or corresponding to the value; i. e., is in the particular value status or aspect.

The electrical representations of digits are the electrical conditions of the register units when such digits are standing therein.

A register cycle is one in which the register units of an order progress through all the value states.

A value cycle is one in which the register units of an order operate to register all the values, one after another. It is coextensive with the register cycle.

An indicating cycle is one in which all the characters are available, one after another, for manifestation or indication by the cathode ray means or other suitable means. It is also the cycle of the pattern emitter.

The totaling period is one in which a selected value entry is made in the totalizer.

Manifesting means is a broad term applicable to the cathode ray indicating means.

Other terms will be made clear as they occur.

A detail description follows:

2. *The mechanical structure*

A cabinet 135 (Figs. 1 and 2) conveniently houses the electronic commutator, electronic totalizer and associated entry control apparatus and circuit elements, as well as parts of the indicating apparatus all of which will be described later. The cathode ray tubes of the indicating apparatus are mounted at the right upon cabinet 135, and the value selecting key apparatus is mounted at the left upon the cabinet. The key apparatus will now be described.

*The key apparatus (Figs. 1, 2, 3 and 4).*—This apparatus includes a case 137 encompassing a framework comprising a top plate 146 and bridge plates 147 and 148. Banks of value keys 138 are guided in slots of these plates for vertical, slidable movement. There are also a start key 220, a substract key 225 and a substract release key 230, all guided in plates 146, 147, and 148 for vertical, slidable movement. Each key is normally held in upper position by its own spring 149. For each bank of value keys 138 and for the pair of keys 225 and 230, there is one latch bar 214. Each bar is pivotally supported by a pair of rocker arms 215 freely mounted on a rod 216 spanning the width of the framework, and a spring 217 urges the bar to the right. There are bent over ears 218 on each bar, at least one ear for each key to be latched down by the bar. Such key is formed with a lug 219 inclined at the bottom. A shoulder 211 is formed in the lug above its nose. When a key is in upper position, the bottom of its lug 219 rests against the adjacent ear 218 of a latch bar 214. Upon depression of the key, the inclined bottom of its lug 219 cams against the ear to push the bar to the left. As soon as the nose of the lug is past the ear, spring 217 returns the bar to the right, seating the ear on top of the shoulder 211 of the lug. The key is thereby latched down, and may be released by depression of any other key in the same column or bank. Such other key when depressed will, in its initial downward movement, cam the bar 214 to the left in the manner described, and the bar will thereupon release the previously depressed key in the same column or bank. In this fashion, any key, except the start key 220, will be latched down upon its depression and will be released by depression of another key in the same column.

As illustrative, four banks of value keys 138 to be used for selecting values in different orders of the decimal notation are provided. The denominational order relation of the key banks is designated in Figs. 1 and 2 by legends *u, t, h* and *th*, signifying units, tens, hundreds, and thousands orders, respectively. It may be noted here that these legends have a similar significance in association with any other elements of the machine to be described hereinafter. Fo each value key, there is a pair of coacting key contacts, generally designated 108 and which may be differentiated by the digit indicative of the key value; e. g., 108—7 designates the key contacts relating to digit 7 and associated with a key 138—7. The bottom of each value key has an attached insulating cam piece 212 engaging the shiftable, spring blade of the associated key contacts. Upon depression of a key 138, its cam piece 212 closes the related key contacts, and these remain closed until the key is unlatched and returned to upper position.

The subtract key 225 (Fig. 4) has an insulating cam piece 228 attached to its stem. This cam piece operates a horizontal, insulating strip 227 which has slotted coaction with the shiftable spring blades of a gang of contacts generally designated 107 and further differentiated in the circuit diagram (Fig. 4d) to be described later. Upon depression of the key 225, its cam piece 228 pushes strip 227 to the left, reversing the status of all the contacts 107. Release of the subtract key may be effected by depression of the key 230, this being the sole function of the latter key.

The start key 220 (Fig. 3) has fixed to its stem an insulating cam piece 223 engaged with the central, spring blade of two-sided contacts 95. The right side of these start keys contacts are normally closed and the left side normally open. Upon depression of the start key, the status of contacts 95 is reversed. There is no latching means for the start key and when it is released by the operator, contacts 95 re-assume normal status.

*The cathode ray tubes* (Figs. 1 and 2).—The indicating apparatus includes four cathode ray tubes 150u, t, h, and th. The tubes are mounted in sockets 142 carried by a cross bar 143 bridging side plates 140. The front ends of the tubes protrude through a front plate 144 secured to the side plates. To enance the clarity of images displayed by the tubes, a hood 145 is attached to the front plate 144 and surrounds the protruding ends of the tubes. By means, including a pattern emitter of the type disclosed in U. S. Patent 2,264,587 to R. I Roth, value representations produced by the electronic accumulator are converted into character displays on the screens 155 of the tubes 150, as will be described subsequently.

3. *The oscillator and related pulsing means*

Electrical pulses are utilized for many purposes of this invention. The primary source of these pulses is, preferably, an electronic oscillator of the multivibrator type. Pulses produced by the oscillator are modified and converted by related pulsing means into derived pulses which have functions brought out in subsequent sections of the description.

The oscillator of the multivibrator type is essentially a two-stage, resistance-coupled amplifier of which the output of each stage is fed back to the input of the other stages. Such an oscillator produces two trains of square-topped pulses, each train being 180 degrees out of phase with the other train. The pulses of each train will be converted into derived pulses of extremely steep wave front and short duration. The circuit of the oscillator generally designated M in Fig. 11a will now be described.

Referring to Fig. 11a, the closure of line switch 106 applies voltage from a suitable source to lines 54 and 51 and to a voltage divider across these lines and composed of resistors 55, 56, 57, and 58. Lines 50, 61, and 80 tap this voltage divider at such points that they are positive with respect to one another and to line 51 in the order named. The oscillator comprises twin tubes 83a and 83b of which the common cathode connects to line 61. Anode resistors 84a and 84b connect tubes 83a and 83, respectively, to line 50. The grid of 83a is coupled by a condenser 85a to the anode of tube 83b, while the grid of 83b is coupled by a condenser 85b to the anode of 83a. Grid leak resistances 86a and 86b connect the condensers 85a and 85b and the associated grids to line 61, so that the normal bias of tubes 83a and 83b is zero. Such a circuit network is unstable and oscillations are initiated by incipient electrical disturbances. For instance, an increase in current through tube 83a produces an increased voltage drop across resistor 84a, reducing the potential across 83a. This decrease is applied by condenser 85b to the grid of tube 83b, increasing its bias. Current through tube 83b decreases, diminishing the voltage drop across resistor 84b, increasing the potential across 83b. Condenser 85a feeds this increase to the grid of 83a, decreasing its bias further and thus causing a rapid increase of current flow through 83a. These actions occur substantially instantaneously, with cumulative effect. Current flow through 83a is a maximum when 83b is at cut-off. When this condition is reached, the charge in condenser 85b leaks off through resistor 86b. When the leakage is completed, the tube 83b starts to conduct, and the oscillator operation is instantaneously reversed; that is, tube 83b progresses to fully conductive status and tube 83a to cut-off status. In this manner, tubes 83a and 83b continually alternate in status. The frequency in oscillator cycles per second of the oscillator is approximately $$\frac{1}{f} = R_{86a}C_{85a} + R_{86b}C_{85b}$$

The oscillator action produces alternate and momentarily sustained voltage drops across resistors 84a and 84b. The voltage waves thus produced in these resistors are square-topped and suitable for conversion into pulses having a steep wave front and extremely short duration. The voltage waves across resistors 84a and 84b are graphically indicated in lines a and e, respectively of Fig. 10, and it will be noted that those across one resistor are 180 degrees out of phase with those across the other resistor. The oscillator cycle may be defined as the period between corresponding points of two successive oscillations of the same train. For convenience, the waves or pulses produced across a resistor may be designated hereinafter by the designation of the resistor. Also, a line of a timing chart may be indicated by the number of the figure showing the timing chart, followed by a dash and the line designation; e. g., Fig. 10—a indicates line a of Fig. 10.

The wire joining the anode and anode resistor 84a of tube 83a is connected by parallel condensers 88a, 88aa, 88aaa to resistors 89a, 89aa, and 89aaa. Condensers 88b and 88bb are similarly connected to the anode of tube 83b. A rise in anode potential of tube 83a charges up condensers 88a, 88aa, 88aaa, and current flow occurs across resistors 89a, 89aa, and 89aaa, so that positive pulses appear on these resistors. A drop in potential of the anode of 83a causes the condensers to discharge and produce negative pulses on the resistors. Similarly, the rise and fall of the anode potential of tube 83b causes positive and negative pulses to appear on resistors 89b and 89bb. The RC product of each condenser-resistor pair is relatively small so that the square-topped waves of anode voltage will be converted by each such pair into pulses of extremely short duration and steep wave front. Fig. 10—b illustrates the pulses produced on resistors 89a, 89aa, and 89aaa and Fig. 10—f shows the pulses produced on resistors 89b and 89bb by the continuous operation of the oscillator.

Resistor 89a is tapped by a connection to the grid of a tube 90a, and resistor 89aaa is connected to the grid of a tube 90aaa. Connections are also made from points of resistors 89b and 89bb to the grids of tubes 90b and 90bb, respectively. All of these resistors terminate at cathode line 61, so that the normal grid bias of tubes 90a, 90aaa, 90b, and 90bb is zero and the tubes are normally fully conductive. Accordingly, the positive pulses on these resistors have no effect. On the other hand, the negative pulses on the resistors so reduce the grid potential of the tubes as to render them non-conductive, thereby producing amplified positive pulses on their anode resistors 91a, 91aaa, 91b, and 91bb which are in phase with the motivating negative pulses on resistors 89a, 89aaa, 89b, and 89bb. The pulses on 91a and 91aaa are graphically indicated in Fig. 10—c and those on 91b and 91bb are shown in Fig. 10g.

Resistor 89aa is tapped by a connection to the control grid of a pentode 90aa. This resistor terminates at line 80 which is negative with respect to cathode line 61 to such degree that the control grid of pentode 90aa normally is at sufficient negative bias to maintain this tube at cut-off for the maximum voltage which is to be applied to the screen grid of the tube. It is apparent that the negative pulses on resistor 89aa will not affect the pentode. The positive pulses on resistor 89aa will increase the control grid potential of tube 90aa but the tube will remain substantially non-conductive if its screen grid potential is low. When the screen grid potential is increased, the positive pulses on resistor 89aa produce current surges through tube 90aa, causing negative pulses to appear on anode resistor 91aa, the form of which is shown in Fig. 10—d. The dotted portion of Fig. 10—d indicates the timing of such negative pulses which would appear were the screen grid at high voltage. Actually, only the full line pulses will appear.

The foregoing has described an oscillator of the multivibrator type to produce square-topped waves, means to convert these waves into extremely sharp pulses, and amplifier tubes to invert these pulses into pulses of reverse polarity. The latter pulses are employed for operating an electronic commutator and electronic totalizer and other parts of my invention. Before explaining the operation of these parts, a fundamental circuit contained therein will be described. This fundamental circuit is a trigger circuit, a description of which follows.

4. Trigger circuit

The trigger circuit is shown in Fig. 8a and includes two vacuum tubes 68L and 68R so interconnected that when either is conductive, the other is at cut-off. Control pulses are applied to the circuit to reverse the status of the tubes. Voltage values at points of the circuit will differ according to whether the tubes are in one relative status or in the reverse status. Variations in voltage at such points may be used for various controlling purposes.

Voltage is applied to lines 50 and 51 and, through a voltage divider comprised of resistors 56 and 57—58, to line 61. The trigger circuit unit is shown within the dotted line box in Fig. 3a. This unit comprises two impedance networks which may be hereinafter referred to as left and right hand sides, portions or branches. The branches are symmetrical and corresponding elements thereof will be given the same reference number; those of the left hand branch may be distinguished by appended letter L and those of the right hand branch by letter R. Each branch comprises resistors 62, 63, and 64, a vacuum tube 68, and a condenser 65 shunting resistor 63. The anode of each tube is connected to line 50 by the resistor 62 of the same branch. The grid of the tube in one branch is connected to the point 67 of the opposite branch. The two tubes are shown as a twin triode, and their common cathode connects to line 61. Each tube is so chosen as to be conductive when its grid is substantially at cathode voltage; that is when the grid bias is substantially zero. The values of the elements are so chosen that when one of the tubes is at cut-off, the grid bias of the opposite tube will be substantially zero and the latter tube will be conductive; i. e., at low impedance. An efficient value relationship is one in which resistors 62 and 64 are equal in value, resistors 63 are approximately three times this value, and condensers 65 have a capacity of the order of a few hundred micromicrofarads. A tube may be referred to as on when it is conducting current, and as off when it is at cut-off. Each branch may be referred to as on or off according to whether its tube is on or off. For convenience, the trigger circuit unit will be considered as on or off in accordance with the on or off status of the left hand branch.

In further explanation, assume tube 68L is on. Accordingly, its impedance is low and the potential at anode-connected point 66L is then only slightly above cathode potential. The accompanying potential drop across resistors 63L and 64L forces the potential at point 67L below that of cathode line 61. Since the grid of tube 68R is connected to point 67L, the grid will at this time be biased sufficiently negative to maintain tube 68R off. The tube 68R, being off, its impedance is high and the potential at anode-connected point 66R is also high. The accompanying potential drop across resistors 63R and 64L does not force the potential at point 67R below cathode potential. Since the grid of tube 68L is connected to point 67R, the potential then existing at this point is sufficient to hold the grid at zero bias, so that tube 68L will be maintained conductive. In this manner, tube 68L when on maintains the 68R off and, conversely, tube 68R in off status maintains tube 68L in on status. The tubes in this relative status establish one state of stability of the trigger circuit unit; namely, the on state. In the reverse state of stability; that is, in the off state of the circuit, tube 68R will be on and tube 68L will be off. Also, the voltage values at the corresponding points of the two branches will be reversed and the interconnections between the branches will maintain the circuit in off state. The circuit may be reversed in state by a pulse applied thereto. Such pulse may be positive or negative and may be applied to only one branch or to both branches concurrently. The manner in which the applied pulses reverse the circuit status or trip the circuit from one state to the other will now be explained. The explanation will be concerned first with the application of a positive pulse.

Assume that the trigger circuit is on; i. e., tube 68L is on and tube 68R is off. Assume, further, that a steep positive pulse is transmitted from a suitable source through a condenser 77a to a resistor 72a and that the pulse is of sufficient amplitude to raise the potential at point 67L and, hence, the grid potential of tube 68R above cut-off value. Tube 68R starts to conduct current from line 50 through resistor 62R and the tube to line 61. The potential at point 66R drops rapidly, feeding a negative pulse through condenser 65R to point 67R. Thereupon, the potential at the point 67R and, hence, the grid potential of tube 68L decreases suddenly to cut-off value and current flow in 68L ceases substantially instantaneously. Point 66L has an accompanying rapid rise in potential, and the resulting positive pulse is fed by condenser 65L to point 67L, promoting the increase in grid potential of tube 68R which was initiated by the positive pulse on resistor 72a. Tube 68R is now on and tube 68L is off, the reverse of the previous status of the tubes. In this manner, a positive pulse applied to point 67L has triggered the circuit from on state to off state. To trip the circuit back from off to on state, a positive pulse may be applied via condenser 77b and resistor 72b to point 67R. The grid of tube 68L thereupon is increased in potential to start current flow through this tube. In a manner now clear, the shift in status will continue until tube 68L is again on and tube 68R is off; i. e., the trigger circuit unit has been switched back, by a positive pulse applied to point 67R, from off to on state.

It will be clear that positive pulses applied successively to points 67L and 67R will effect successive shifts of the circuit state, every other pulse returning the circuit to its original state.

The shift control pulses may be applied concurrently to points 67R and 67L and still effect only a single shift of the circuit for each concurrent application of the pulses. The direction of shift will be determined by the state of the circuit itself. Assume, for example, that the circuit is on and positive pulses are concurrently applied to condensers 77a and 77b as by a wire (see dot and dash line) connecting them in parallel to a suitable source. The pulse applied through condenser 77b and resistor 72b to point 67R will be ineffective because the tube 68L already is conductive in the assumed on state of the circuit. On the other hand, the pulse applied at the same time via condenser 77a and resistor 72a to point 67L will raise the grid voltage of tube 68R above cut-off value, the tube will start to conduct, and the shift from on to off state of the circuit will be brought about in the manner previously described. Similarly, if the circuit is off and positive pulses are applied concurrently to points 67L and 67R, only the pulse on 67R will take effect, and the circuit will be shifted to on state.

Instead of shifting the circuit by means of positive control pulses, it may be shifted by negative control pulses. Assume that the circuit is off; i. e., tube 68L is off and tube 68R is on. A negative pulse, of sufficient amplitude, if now applied to point 67L via resistor 72a and condenser 77a will reduce the grid voltage of tube 68R to cut-off value. The potential at point 66R will rise suddenly, feeding a positive pulse through condenser 65R to point 67R and, hence, to the grid of tube 68L. The grid voltage of tube 68L will rise above cut-off value and the tube will start to conduct. In a manner explained hereinbefore, the reversal of status of the circuit will be completed, and the circuit will attain the on state. With the circuit in on state, a negative pulse applied to point 67R will reduce the grid potential of tube 68L to cut-off value, point 66L will rise in potential, feeding a positive pulse via condenser 65L to the grid of tube 68R. Tube 68R will start to conduct and the circuit will shift to off state.

For reasons indicated in the explanation of the concurrent application of positive pulses to points 67L and 67R, only one tripping action will be effected if negative pulses are applied at the same time to these points.

It will be noted that a positive pulse applied to a point 67L or 67R has the opposite effect of a negative pulse applied to such point.

Fig. 8b graphically illustrates the wave of voltage at point 66L or 66R upon successive shifts of the circuit status. Considering point 66R, for example, with the circuit off, the potential at this point is low. When the circuit is being shifted to on state, the potential at point 66R rises exponentially, reaching its full value when the shift is completed. The exponential rise in voltage of such point is shown by the wave front (Fig. 3b). Upon subsequent reversal of the circuit from on to off state, the voltage at point 66R drops substantially instantly to low value.

Fig. 8c illustrates the wave of voltage at point 67L or 67R upon successive shifts in circuit status. Considering point 67R, for instance, when the circuit is off, this point is at a steady low voltage, indicated at n in Fig. 8c. When the trigger circuit is being shifted to on state, the potential at the point 67R rises exponentially to substantially cathode potential. The point 67R then stays at this value until the circuit is shifted to off state, whereupon the point drops abruptly below the n potential and then rises exponentially to n potential. In the initial part of such shaft, tube 68R starts to conduct and condenser 65R discharges substantially instantaneously through a circuit including tube 68R and resistor 64R, thus producing a sudden steep drop in potential of point 67R, which is in the form of a sharp negative pulse. As the condenser completes its discharge, point 67R rises in potential exponentially to the n value, at which it stays until the circuit is again tripped on. Thus, whenever a shift from on to off state of the trigger circuit occurs, a steep negative pulse is produced at point 67R. Similarly, during shift of the circuit from off to on state, a steep negative pulse appears at point 67L.

It has been assumed this far that the trigger circuit is shifted from one to another state solely because of the application of pulses applied to one or the other of the two branches of the circuit. For various purposes of the invention, it is desirable to introduce an additional factor to determine whether the trigger circuit shall be tripped by an applied positive pulse. Briefly, the additional factor is an increase in potential at a pertinent point of either of the branches before the pulse is applied. The previous increase in potential at such point plus the increase in potential produced by the pulse supply sufficient potential increase to effect a tripping operation of the circuit. The previous increase in potential at a point of the circuit may be referred to as the conditioning, preparation, or priming of the circuit to enable it to be tripped when a positive pulse is thereafter impressed. Obviously, with this mode of operation, the positive pulse by itself should be inadequate to trigger the circuit, and also the preparatory increase in potential should be inadequate by itself to trigger the circuit. Only the combined effect of the pulse and the preparatory increase of potential should be effective to trigger the circuit.

In Fig. 8a are shown means illustrating the principle by which the preparatory increase in potential may be produced. For the desired mode of operation, switches 79a and 79b are closed, respectively connecting points 67L and 67R to resistors 74a and 74b. These resistors tap points 60a and 60b of voltage dividers 69a—70a—71a and 69b—70b—71b, respectively. Resistances 71a and 71b of these voltage dividers are shunted by switches 73a and 73b when closed. With the latter resistors shunted by the closed switches, the potential at points 60a and 60b is only slightly above that of line 61. In view of resistors 74a and 74b, the potential at points 67L and 67R is not substantially different from that when switches 79a and 79b are left open. The positive pulse applied to either points 67L or 67R via condenser 77a and resistor 72a or condenser 77b and resistor 72b is inadequate, of itself, to trigger the circuit. To prime the circuit so that it will be tripped by a positive pulse, either the switch 73a or 73b or both are first opened. Assume, for instance, that switch 73b is opened. Accordingly, resistance 71b is placed in circuit with resistances 69b and 70b, resulting in an increase in potential at point 60b. There is an accompanying increase in current through resistor 74b, the switch 79b (now closed), and resistor 64R, as a consequence of which the potential at point 67R rises. This is the preparatory rise which, of itself, is inadequate to raise the grid voltage of tube 68L above cut-off. If a positive pulse is now applied via condenser 77b and resistor 72b to point 67R, the further increase in potential at this point supplements the preparatory increase in its potential, and the two together raise the grid voltage of tube 68L above cut-off. Consequently, the circuit will trigger from a state in which tube 68L is at cut-off to one in which this tube is conductive. Similarly, by opening switch 73a, the potential at point 67L will be preliminarily increased in preparation for the circuit to be reversed from on to off status by a positive pulse appearing on resistor 72a.

The means shown in Fig. 8a for priming the circuit to be subsequently tripped are merely illustrative of the principle. In practice, the means utilized to prime the circuit may be another trigger circuit, of which one impedance branch may be represented by the resistors numbered 68, 70, and 71. Section 5 which follows will indicate such priming relations between successive trigger circuits.

A glow lamp 78 is provided to visually indicate the status of the trigger circuit. The tube 68L is connected by a current limiting resistance 59 to point 66L. When the tube 68L is conductive, point 66L is at low potential, and there is sufficient igniting potential across the lamp 78. When the tube 68R is at cut-off, the potential at 66L is high, and there is insufficient igniting potential for the lamp. The status of various elements of the trigger circuit unit when the circuit is on and when it is off is indicated below, "high" and "low" referring to potential.

| Unit On | Unit |
|---|---|
| Lamp 78 lit | Lamp 78 dark |
| 68L on—68R off | 68L off—68R on |
| 66L low—66R high | 66L high—66R low |
| 67L low—67R high | 67L high—67R low |

The trigger circuit is a constituent of an electronic commutator and totalizer and of other parts employed in this invention. Wherever the unit appears, its elements will be given the same reference characters as the corresponding elements of Fig. 8a. The electronic commutator will now be described.

5. *The electronic commutator*

The commutator is part of entry control means for the totalizer. There are a number of progressively operable trigger circuit units in the commutator and an additional unit, called a control unit. The number of units which is provided depends on the number of steps of commutator operation to be performed in a commutator cycle. In the illustrated embodiment, there are ten units, one being the control unit and the others the stepping units. The control unit is operated under manual control to start the commutator cycle. The other units then turn on step by step. When the last step has been performed, the cycle automatically terminates. The units are thus arranged to form a start-stop electronic commutator. Figs. 11a and 11d show the circuits of the commutator, and its timing is illustrated in Fig. 10.

As explained in section 3, the closure of line switch 106 places power upon lines 54 and 51, and voltage is applied through voltage divider 55—56—57—58 to lines 50, 61, and 80 which are positive with regard to one another and to line 51 in the order stated. The control unit of the commutator is designated T and the stepping units are designated C9 to C1. Initially all the units are off; that is, points 66L and 67L are at high potential and lamps 78 are dark. A voltage divider comprised of resistors 92 and 93 (Figs. 11a) is across lines 50 and 51, the resistor 93 normally being shunted by the right side of start key switch 95 (also see Fig. 3) and a condenser 94. This condenser is thus normally charged to the potential across resistor 93. The left, normally open side of the start switch 95 is connected by a wire 20 (Figs. 11a, 11d, and 11g) to one side of a hand switch #1 IND (Fig. 11g). With this switch in shown position, it connects wire 20 to a wire 21 which leads to a resistor 125. Resistor 125 is tapped by the grid of a triode 126a, the cathode of which connects to line 61, whereas the resistor terminates at lower potential line 80. Thus, the grid bias is normally negative and the tube 126a is at cut-off. The anode of the tube 126a is connected by a wire 22 (Figs. 11a, 11d, and 11g) to point 66L of control unit T of the commutator. To start a commutator cycle, start key 220 (Fig. 3) is depressed, opening the right side and closing the left side of start switch 95 (see also Fig. 11a). Condenser 94 thereupon discharges a steep positive pulse via the left side of switch 95, wire 20, switch #1 IND, and wire 21, upon the resistor 125 (Fig. 11g). The grid voltage of tube 126a is increased above cut-off and by reason of the anode connection, via wire 22, to point 66L (T), a sharp negative pulse appears at this point. This pulse is applied by condenser 65L to the grid of tube 68R (T) turning off this tube and causing the tube 68L (T) to be turned on. Thus, unit T has been turned on under manual control. With T on, its point 66R is at high potential, and the increase in potential is transmitted by resistor 74b to point 67R of the first stepping unit C9. Unit C9 is thus primed to be turned on by a positive pulse applied to its related resistor 72b.

As described before in section 3, positive pulses (Fig. 10—c) are continually produced across resistor 91a (Fig. 11a). These pulses are transmitted by wire 96 and parallel condensers 77b and resistors 72b to the points 67R of all the C9 to C1 units simultaneously. The effect of each pulse is felt however only by that unit which has been primed at its point 67R. With unit T now on, it is priming point 67R of unit C9. Thus, the first pulse on resistor 91a following the turning on of unit T is effective only upon unit C9 and trips the latter unit to on state. In the same way as T is connected to C9 to prepare it to be turned on, unit C9 is connected to C8, unit C8 to C7, and so on, the last two such connected units being C2 and C1. Thus, when C9 is turned on by a pulse on resistor 91a, it primes C8 to be turned on by the next pulse, C8 upon tripping to on state primes C7 to be turned on by a third pulse, and so on until C1 is turned on. Point 66R of C1 (Fig. 11d) is connected by a resistor 74a and wire 23 to a point of resistor 64L of T. Hence, when C1 is on, the increase in potential of its point 66R is transmitted to point 67L of T, priming the latter to be turned off by a positive pulse applied to related resistor 72a. As described in section 3, positive pulses (Fig. 10—g) are continually produced on resistor 91b (Fig. 11a). These pulses are transmitted by the condenser 77a and resistor 72 to point 67L of unit T but are ineffective before T is primed at its point 67L by unit C1 in the manner just described. The first pulse on resistor 91b following the priming of T by C1 trips T from on to off state. Briefly, the rise in potential at 67L (T), produced by the pulse fed from resistor 91b, adds to the preparatory increase in potential of this point, resulting from the turning on of C1, to increase the grid voltage of tube 68R (T) above cut-off. Tube 68R (T) starts to conduct and, in a manner explained in section 4, the tube 68L is brought to cut-off, so that unit T is now off.

The tripping of T to off status brings about the simultaneous tripping of units C9 to C1 to off state. For this purpose, the midpoint of resistor 63L (T) is connected by a resistance 97 to the screen of tube 90aa. When T is on, point 66L (T) and the midpoint of resistor 63L (T) are at low potential, so that the screen voltage of tube 90aa is also low. When T is off, its point 66L and the midpoint of its resistor 63L are at high potential, so that the screen voltage of tube 90aa is high. As previously explained in section 3, when the screen potential of tube 90aa is high, the positive pulses on resistor 89aa (see Fig. 10—b) are effective to produce negative pulses on anode resistance 91aa (Fig. 10—d). The dotted line pulses in Fig. 10—d are those which would appear were the screen voltage of tube 90aa high. Actually, the negative pulses (Fig. 10—d) do not appear except when T is off. T is turned off at "1" (Fig. 10) just as a positive pulse on resistor 89aa is dropping in value. Hence, the screen voltage of tube 90aa rises, owing to the increase in potential of point 66L (T), while the grid voltage descends and a negative pulse on resistor 91aa does not appear at this time. However, the next positive pulse on resistor 89aa is effective to produce a negative pulse on resistor 91aa. This negative pulse is transmitted by a condenser 98 to wire 96 and then via condensers 77b and resistors 72b to the points 67R of units C9 to C1. The negative pulse is of sufficient amplitude to turn off each of the units C9 to C1. Briefly, the negative pulse so reduces the potential at points 67R that the grid potential of tubes 68L is reduced to cut-off. Tubes 68L turn off, and the C9 to C1 units simultaneously assume an off state. All the commutator units are now off, and the commutator cycle ends at "0" (Fig. 10).

The foregoing has described a cycle of the start-stop electronic commutator. Unit T was turned on under manual control. Successive advancing pulses on resistor 91a (Fig. 10—c) then turned on units C9 to C1 in succession. Unit C1 prepared T to be turned off by a positive pulse on resistor 91b (Fig. 10—g). With unit T off, a negative pulse on resistor 91aa (Fig. 10—d) turned off C9 to C1 simultaneously. For convenience, the commutator cycle is divided into ten equal index positions designated D, 9 - - - 1, with the end of the cycle being designated "0." With switch #1 IND closed (Fig. 11g), the unit T is turned on entirely under manual control and in chance time relation to the oscillator pulses. However, the remaining operations of the commutator are in fixed time relations to the cycle. Briefly, C9 turns on midway between "D" and "9," C8 midway between "9" and "8" and so on until C1 is turned on midway between "2" and "1." Unit T then turns off at "1" and C9 to C1 turn off at "0." Before another commutator cycle may be started, condenser 94 (Fig. 11a) must be allowed to recharge and then start key 220 (Fig. 3) must be operated again.

The operations effected during the commutator cycle are timed by the pulses derived from the oscillator. Hence, it is the oscillator frequency which determines the duration of the cycle. The oscillator frequency is adjusted in accordance with the desired rate of operation of the commutator and of parts controlled thereby. For example, if an index portion is to have a duration of 1/7500 of a second, the oscillator cycle (interval between successive oscillator pulses of the same train) must have this same duration; i. e., the oscillator is set to a frequency of 7500 oscillations a second. Since commutator operations and operations controlled thereby are timed by the oscillator pulses, a variation in frequency of the oscillator will not disrupt the cyclical timing of the machine.

While each advancing pulse (Fig. 10—c) is impressed on all the units C9 to C1 simultaneously, each pulse turns on only one unit. Thus, with unit C9 primed at its point 67R, the first advancing pulse initiates the tripping of this unit to on status. Point 66R (C9) rises in potential exponentially (Fig. 8b), with an attendant exponential rise of point 67R (C8). As the potential on point 67R (C8) is rising, the first advancing pulse is receding. By the time point 67R (C8) has attained effective priming potential, the first advancing pulse has declined in power and has ceased to exist, for practical purposes. Thus, this pulse will be unable to turn on C8. Similarly, each of the advancing pulses will turn on only one unit and will become powerless before the unit effectively primes the next unit. Hence, each advancing pulse may trip only one unit;

i. e., the unit which was primed just before the advancing pulse appeared.

During the commutator cycle, C9 to C1 are sequentially turned on at mid-index times, and their points 67R are maintained at increased potential for 9 to 1 full index portions. The increased potential at these points is utilized to control the production of entry control pulses, negative in character. C9 will control production of a 9-pulse train, C8 will control the production of an 8-pulse train, and so on. The several pulse trains are shown in Fig. 10 (9) to (1). The means to produce the pulse trains under control of C9 to C1 may be in the form shown in Fig. 11d or the form shown in Fig. 11ad. When the number of digits in an order exceeds the maximum number of orders of value selecting means, it is preferred to use the form shown in Fig. 11d. Thus, for the four orders of value selecting keys 138 shown in Figs. 1 and 2, the form illustrated in Fig. 11d is preferred. When the number of orders in the highest amount which may be chosen exceeds the number of digits in an order, it is preferred to use the form shown in Fig. 11ad. In each form, the pulse trains are timed as shown in Fig. 10—(1) to (1). In the first form, only such pulse trains as correspond to chosen digits will appear. In the second form, all the pulse trains will appear but only those corresponding to chosen digits will be fed to the totalizer. The general function of the commutator may be stated as residing in the control during a cycle of the production of trains of entry control pulses proportional in number to the values chosen for entry. The pulse producing means shown in Fig. 11d will first be described.

*Entry control pulse producing means (Fig. 11d).*—This means includes four pentodes 100u, t, h, and th, relating to the units, tens, hundreds, and thousands orders, respectively. The control grids (hereafter called grids) of the pentodes are connected by means including the key contacts 108 of the corresponding orders to the points 67R of C9 to C1. The screen grids (hereafter called screens) of the pentodes are maintained at constant voltage. The suppressor grids (hereafter called suppressors) of the pentodes are connected to means continually producing positive pulses. The anodes of the pentodes are connected to resistors 101u, t, h, and th. Only when the grid potential of a pentode is raised will the pulses applied to the suppressor produce an increased current flow in the pentode and, thereby, produce a negative, entry control pulse on its anode resistor. The pulses applied to the suppressors time the production of the negative pulses on the anode resistors while the grid potential of each pentode determines whether such negative pulses shall appear.

Referring to Fig. 11d, the suppressors of the four pentodes are connected to a common wire 25 which taps a resistor 105 (Fig. 11a). Resistor 105 is capacitatively coupled to resistor 91bb upon which positive pulses (Fig. 10-g) continually appear. Accordingly, these pulses also appear on resistor 105 and are continually applied to the suppressors of the pentodes. Resistor 105 terminates at line 51 which is negative with respect to cathode line 61. Hence, in the intervals between pulses on resistor 105, the pentodes are at cut-off regardless of the grid potential. The screen of pentode 100u taps a voltage divider across lines 50 and 61 and comprised of resistors 102u and 103u. Resistor 103u is shunted by a condenser 104u which aids in maintaining the screen voltage constant. Similarly, the screens of the other pentodes are held at constant potential by voltage dividers 102t—103t, 102h—103h, 102th—103th and by condensers 104t, h, and th. The grid of pentode 100u is connected by a wire 110u to the common side of the bank of key contacts 108u (Fig. 11d). Similarly, the grids of pentodes 100t, h, and th are connected by wires 110t, h, and th to the common sides of the banks of key contacts 108t, h, and th. The key contacts in the different banks are selectively closed by the value keys 138 (Figs. 1 and 2), as explained in section 2. Those key contacts, in the several banks, which correspond to the same digit are commonly connected to the normal sides of digit-characterized contacts 107. There are ten of these latter contacts 107, designated 107—0 to 9, respectively connected by their normally closed sides to the 0 to 9 value key contacts of the several orders. It will be recalled that the entire group of contacts 107 is reversed in status upon depression of a key 225 (Fig. 4), as described in section 2. Whenever a positive amount is to be entered, the key 225 is not depressed and contacts 107 are in the normal status shown in Fig. 11d. The central blades of 107—1 to 9 connect by resistors 99 and wires 109—1 to 9 to points 67R of C1 to C9, while the central blade of 107—0 connects by a resistor 99 and wire 109—0 to minus line 51.

The connections as shown place each of pentodes 100u, t, h, and th under control of a corresponding order of key contacts and place all the orders of pentodes under value-selected control of C1 to C9. When a C unit is turned on, its point 67R rises in potential to the potential of cathode line 61, as explained before in reference to Fig. 8c. When the point 67R is at priming potential only or at the advancing pulse potential only, it is below the cathode line potential, and the grid of a tube connected thereto will not be adequately increased in potential to above cut-off value. In further explanation, assume that an amount 9999 has been chosen, hence contacts 108—9 of all the orders are closed. During a commutator cycle, C9 is switched on at the time shown in Fig. 10. The attendant rise in potential of its point 67R is fed via wire 109—9 and contacts 107—9 to the row of contacts 108—9 of all the orders. Thence the potential rise is fed from these key contacts via wires 110u, t, h, and th to the grids of pentodes 100u, t, h, and th. Thereafter, the positive pulses applied by resistor 105 to the suppressors of the pentodes produce nine entry control pulses on each of the resistors 101u, t, h, and th, at the times shown in Fig. 10—(9). For another example, assume that the amount 8765 has been selected; hence key contacts 108—5 of the units order, 108—6 of the tens order, 108—7 of the hundreds order, and 108—8 of the thousands order are closed. During the commutator cycle, C8 goes on before "8" of the cycle and its point 67R rises in voltage. The voltage rise is transmitted via wire 109—8, the normally closed side of contacts 107—8, the now-closed 108—8 contacts of the thousands order, and wire 110th to the grid of pentode 100th. Accordingly, the pulses applied by resistor 105 to the suppressor of pentode 100th at the "8" to "1" times of the cycle produce eight negative pulses, graphically indicated in line (8) of Fig. 10, upon resistor 101th. Similarly, the closed key contacts 108—7 of the hundreds order transmit the potential increase of the point 67R of C7 to the grid of pentode 100h, and seven negative pulses appear on resistor 101h, timed as shown in line (7) of Fig. 10. In a manner now clear, the closure of contacts 108—6 in the tens order enables the increased potential at point 67R of C6 to increase the grid potential of pentode 100t, and the pulses on resistor 105 are converted by this pentode into six negative pulses, indicated in Fig. 10, line (6), upon resistor 101t. Finally, with contacts 108—5 of the units order closed, the potential increase of point 67R of C5 is applied to the grid of pentode 100u and five negative pulses, as indicated in Fig. 10, line (5) appear on resistor 101u. If either value 4, 3, 2, or 1 were chosen in an order, four, three, two, or one entry control pulse would appear on the anode resistor of the related order pentode under control of C4, C3, C2, or C1, respectively. When a 0 value is selected, contacts 107—0 in the status shown and the closed 108—0 contacts connect the grid of the related order pentode to minus line 51. Hence this pentode will remain at cut-off, and no entry control pulse will appear. It will be clear that in any one cycle, one to nine entry control pulses may appear on any one or more of resistors 101u, t, h, and th, but only such pulse trains as are selected by the closed key contacts will actually appear. For instance, if the chosen amount is 1039, one pulse will appear on resistor 101th, three on resistor 101t, and nine on resistor 101u, and all the other pulse trains will be absent during the cycle.

The above-described entry control producing means is preferred when the number of orders in the highest possible amount which may be chosen is less than the number of digits in the order. When the number of orders in the highest possible amount to be chosen exceeds the number of digits in an order, it is preferred to use the form of entry control pulse producing means shown in Fig. 11ad. This form will now be described.

*Alternative entry control pulse producing means.*—It may be assumed, for instance, that the number of available orders is twelve. Fig. 11ad shows, in full, the first order (u) and last order (hb) of twelve such orders of key contacts 108a. In the previously described form (Fig. 11d), corresponding significant value key contacts of all the orders are connected in common through contacts 107—1 to 9 to points 67R of C1 to C9, while each order of key contacts is connected to the grid of a related order pentode 100. In the second form (Fig. 11ad), each order of key contacts is connected at one side, by a wire 30, to a different order of the accumulator, while corresponding significant digit key contacts of all the orders are connected by contacts 107—1 to 9 and wires 235 to points between the anodes of nine pentodes 100(1) to 100(9) and their respective anode resistors 101(1) to 101(9). One to nine entry control pulses will invariably appear on resistors 101(1) to 101(9), respectively, during the cycle, but only those chosen by the closed key contacts will be fed to the totalizer.

In Fig. 11ad, the C9 to C1 units are diagrammatically shown as boxes and their points 67R are shown as terminals. The points 67R of C9 to C1 are connected, respectively, to the grids of pentodes 100(9) to 100(1). The screens of these tubes are maintained at constant potential in the manner previously described. As before, pulses on resistor 105 (Fig. 11a) are fed by common wire to the suppressors of all the pentodes. During the commutator cycle, as C9 to C1 are turned on sequentially, their points 67R increase the grid potential of pentodes 100(9) to (1) in corresponding sequence. The pulses applied by resistor 105 to the suppressors of the pentodes accordingly produce the (9) to (1) entry control pulse trains shown in Fig. 10 on resistors 101(9) to 101(1) respectively. In this manner, during a commutator cycle, there will invariably appear nine entry control pulses on resistor 101(9) alone, eight on 101(8) alone, and so on. These pulses are fed via wires 235 and contacts 107—9 to 1 to the corresponding digit row of key contacts of all the orders. However, the pulses will travel no further except through closed key contacts. For instance, the "9" pulse train will not be transmitted to wire 30 of the units order if the key contacts 108—9 of this order are open. If these contacts are closed, the (9) pulse train is transmitted therethrough to wire 30 common to the contacts of the units order, and thence to the units order of the totalizer.

Comparison of this modification of the pulse producing means with the one previously described indicates that the modified form permits of an economy in the number of tubes 100 (Fig. 11ad) when the number of orders in the highest amount which may be chosen exceeds the number of digits in the notation, whereas the first form (Fig. 11d) is more economical of tubes 100 when the number of orders is less than the number of digits in the notation. In either form, only those trains of entry control pulses are transmitted to the totalizer which are selected by the digits in the amount to be entered. Each such pulse train is composed of a number of pulses equal to the numerical value selected for entry in an order of the accumulator. Thus, if a value 1 is selected, one pulse will be transmitted to the totalizer; if value 2 is selected two successive pulses will be transmitted; and so on up to value 9, the selection of which results in nine successive pulses being transmitted. The several entry control pulse trains corresponding to the selected digits are shown in Fig. 10—(1) to (9). The selection of values in different orders will result during a commutator cycle in the transmission of entry control pulses to each order of the totalizer, the number of pulses fed to an order being proportional to the selected value for the order. Thus, if 9614 is to be entered, four pulses are sent to the units order, one pulse to the tens order, six pulses to the hundreds order, and nine pulses to the thousands order.

The totalizer will now be described.

6. *The totalizer*

The totalizer will be described in this section without reference to character indication or total readout operation. It may be assumed that the machine is not set for indicating or total readout operation.

A totalizer with four orders is shown in Figs. 11b, c, e, and f. Each order comprises a circuit network including means to receive entry control pulses and invert them to entry pulses. A series of value register units are included in the circuit network. Each register unit is a trigger circuit unit such as described in sections 4 and 5. The number of entry control pulses received by the network will be converted to a corresponding number of entry pulses and will effect a similar number of steps of operation of the register units. In this manner, the selected entry will be made.

The register units selectively produce electrical manifestations of the different digits of the chosen notation. When the capacity of one order is exceeded, it produces carry entry to the next order. Hence, the denominationally related order networks of the totalizer will electrically and electronically manifest the total of successively entered amounts. Positive and negative amounts will be entered in the same manner, but in the case of the negative amount, the number of entry control pulses produced in each order will be proportional to the nines complement of the selected value and the elusive one will be entered in the lowest order.

The number of register units in each order is less than the number of digits which may be manifested thereby. In the present case, the tens notation is used and five register units are provided to produce combinational patterns of electrical and electronic conditions indicative of the digits 0 to 9. The general code or plan of digit representation is similar to that disclosed in my prior application, Serial No. 394,883, filed May 23, 1941, and which has become Patent #2,402,989, July 2, 1946, but the register units and the network as a whole are far simpler in the instant case.

Fig. 9 shows the table of values manifested by the different register units of an order. There are five units in each order, designated A6—1, A7—2, A8—3, A9—4, and A0—5. As is now understood, when a unit is on, its right hand points 66R and 67R are higher in potential than the left hand points 66L and 67L, and when the unit is off, the left hand points are at higher potentials than the right hand points. When all the units are off, they manifest 0. The first pulse will turn on A6—1 and the units then will manifest value 1. The second, third, fourth, and fifth pulse will sequentially turn on A7—2, A8—3, A9—4, and A0—5, and the units will progressively register 2, 3, 4, and 5. The sixth pulse will turn off A6—1 and the units then will register 6. The seventh, eighth, and ninth pulses will turn off A7—2, A8—3, and A9—4 sequentially, the units progressively registering 7, 8, and 9. The order of units is then at its capacity, and the tenth pulse will turn off A0—5. All the units then will again be off, representing 0. Thus, the units have progressed through a full value cycle as the result of ten steps of operation effected by ten pulses. Obviously, if the units are initially in any other status than the 0 status, ten pulses will effect a value cycle at the end of which they again will be in the initial status.

All the orders are similarly constructed and it will be simpler to follow the detailed description of the wiring by reference to a single order, say the units or first order shown in Figs. 11b and e. The point 66L of each of the units A6—1 to A9—4 is connected by a resistor 74a to the point 67L of the respectively next order. The point 66R of each of these units is connected by a resistor 74b to the point 67R of the respectively next order. The unit A0—5 has its point 66L connected by a resistor 74b and wire 31 to point 67R of A6—1, and its point 66R connected by a resistor 74a and wire 39 to point 67L of A6—1. By virtue of the described coupling between the units, when A6—1 is off, its point 66L being at high potential applies priming potential to point 67L of A7—2. Similarly, A7—2 in off state is applying priming potential to point 67L of A8—3. Likewise A8—3 when off primes point 67L of A9—4 and A9—4 when off primes point 67L of A0—5. With A0—5 off, its point 66L being connected to point 67R of A6—1 applies priming potential to the latter point. With A6—1 on, its point 66R is at high potential and applies priming potential to connected point 67R of A7—2. Similar priming relations exist between the remaining units except between A0—5 and A6—1. The points 66R of A0—5, being connected to point 67L of A6—1, when A0—5 is on it applies priming potential to point 67L of A6—1.

The entry control pulses are converted to entry pulses upon an input wire of the register units of an order. The input wire 96u of the units order is connected through parallel condenser-resistor paths to points 67L and 67R of all the register units of the order, so that each entry pulse is applied simultaneously to opposite sides of all the register units. The path between wire 96u and each point 67L comprises a condenser 77a and a resistor 72a, and that between the wire 77a and a resistor 72a, and that between the wire and each point 67R comprises a condenser 77b and a resistor 72b. As previously described in section 4, the priming potential applied to a side of a trigger circuit is not sufficient of itself to reverse the circuit. Nor is the positive pulse potential applied to a side of the trigger circuit sufficient to trip the circuit. Further, pulses applied to opposite sides of a trigger circuit simultaneously are selectively effective depending on the status of the circuit. Thus, in order for a register unit to be reversed from off to on state, its point 67R must be at priming potential and an entry pulse must be fed to this point. Should the register unit already be in on state, and its point 67R be at priming potential, the pulse fed to this point will have no effect and the unit will stay in on state. In order for a register unit to be tripped from on to off state, its point 67L must be at priming potential and an entry pulse must be fed to this point. Should the unit be off and its point 67L primed, the pulse fed to this point will have no effect and the unit will remain off. As is now clear, although each entry pulse on wire 96u is applied simultaneously to all the points 67R and 67L of the register units of the order, it will reverse only the status of that unit which is primed at the side required for reversal.

In further explanation, assume the register units of the lowest order are initially all in off state, representing 0 (see Fig. 9). At this time, each of the units A6—1 to A9—4 is priming point 67L of its next unit, while A0—5 is priming point 67R of A6—1. Accordingly, the first pulse on wire 96u although simultaneously fed to opposite sides of all the units is effective only upon unit A6—1, increasing the potential of its primed point 67R sufficiently to initiate reversal of A6—1 from off to on state. The pulse is not effective on the other units because their points 67L are primed and the increase in potential of these points produced by the pulse would trip them to off state if they were in on state. Since they already are in off state, their status is not reversed by the first pulse. The first pulse has thus turned on only A6—1. With A6—1 on and the other units off, value 1 is manifested (see Fig. 9). Thus, an entry of 1 has been effected by application of one entry pulse. When A6—1 is in on state, its point 66R is at increased potential and its point 66L at reduced potential. Hence, priming potential is removed from point 67L of A7—2 and is applied now to point 67R of A7—2. The second pulse on wire 96u therefore will turn on A7—2. The pulse will have no effect on the other units. For instance, unit A6—1 is still primed at point 67R so that the pulse can be effective only to turn on this unit, a status which it already has. Units A6—1 and A7—2 are now on and the remaining units off, producing a 2 value representation (see Fig. 9). Thus, the two entry pulses have entered 2 in the units order. It will be clear now that a third pulse will turn on A8—3, a fourth pulse will turn on A9—4, and a fifth pulse will turn on A0—5. With A0—5 on, its point 66R is at increased potential and applying priming potential to point 67L of A6—1. Hence, the sixth pulse will turn off A6—1. With A6—1 off, it is priming point 67L of A7—2. Accordingly, the seventh pulse will turn off A7—2. Similarly, the eighth and ninth pulses will turn off A8—3 and A9—4 successively. The tenth pulse will turn off A0—5. This completes a value cycle, and the units are again in their initial 0 status.

For reasons explained in section 5 with regard to commutator operation, one pulse will not be effective to cause successive circuits to be tripped, because the pulse has practically ceased to exist by the time the units whose reversal it has initiated is applying adequate priming potential to the next unit.

The foregoing has described the step by step operation of a totalizer order by successive pulses equal in number to the value to be entered. The stepping operation always begins with the unit following the one last operated by the previous entry. The number of steps of operation equals the number of applied pulses which, in turn, equal the value entered. A series of ten pulses returns the order of units to the status which they had before the first of the series of pulses were applied. This is the case whether the units initially were in 0 value status or in any significant value status. With regard to the branches of the units, they will be turned successively to the same status, each as it turns to this state bringing about an accompanying change in its companion branch to the opposite state. Thus, if the units are all off initially, the entry pulses thereafter applied turn on the left hand branches of the units successively and then turn on the right hand branches successively. Of the ten branches, a group of only five units is in the same state at any one time. Successive steps of operation advance this state from one group of branches to another such group. Stated otherwise, the branches are so interrelated and operated that a group of corresponding states progresses along the chain of branches from one position to a next position upon successive steps of operation of the network of branches.

As mentioned before, negative entry control pulses are selectively transmitted to each order and converted into positive entry pulses upon the inputs of the register units of the order. The pulse inverting means comprise pentodes, one for each accumulator order. Figs. 4e and 4f show the four pentodes designated 113u, t, h, and th associated with the units, tens, hundreds, and thousands accumulator orders, respectively. The anodes of the pentodes 113u, t, h, and th are connected by anode resistors 117u, t, h, and th, respectively, to line 50. The suppressor grids are connected to the cathodes. The screen grids are maintained at constant voltage by a voltage divider composed of two resistors across the lines 50 and 61 and a condenser shunting the lower resistor. The resistors of each voltage divider are numbered 114 and 115 and the shunting condensers are numbered 116, each reference number being followed by letter u, t, h, or th to denote the denominational order of the characterized element. The control grids of the pentodes 113u, t, h, and th tap resistors 112u, t, h, and th respectively. The resistors terminate at cathode line 61, normally maintaining the control grids at zero bias. Hence, the pentodes are normally conductive and their anode potential is low. A negative, entry control pulse on a resistor 112u, t, h, or th reduces the grid voltage of the related pentode, producing a positive, entry pulse upon its anode resistance. Anode resistances 117u, t, h, and th are connected to input wires 96u, t, h, and th. Hence, the entry pulses appearing on these resistances are transmitted to their connected input wires from whence they are fed by the parallel condenser-resistor paths to points 67L and 67R of the units of the related order.

In the form of entry control pulse producing means shown in Fig. 11d, any number of such pulses corresponding to a selected value appear during a cycle upon any of the resistors 101u, t, h, and th. The negative entry control pulses appearing on resistors 101u, t, h, and th are fed by wires 28u, t, h, and th and condensers 111u, t, h, and th to resistors 112u, t, h, and th, respectively. The negative pulses are inverted by pentodes 113u, t, h, and th into positive, entry pulses on input wires 96u, t, h, th of the units, tens, hundreds, thousands orders of the register units.

In the modification of the entry control pulse producing means shown in Fig. 11ad, one to nine entry control pulses always appear during a cycle upon resistors 101(1) to 101(9) but only those corresponding to values selected in each order are passed through to the wires 30 and thence by condensers 111u to 111bh to the resistors 112u to 112bh. Each such resistor will be associated with the grid of a related order pentode (such as 113u) for inverting the negative entry control pulses into the positive entry pulses upon the inputs of the corresponding order of register units.

When an order of register units exceeds its capacity; i. e., passes from a manifestation of value 9 to or beyond a 0 value manifestation, carry must be effected to a higher order of register units. The carry means will now be described.

*The carry means.*—Stated generally, whenever a carry condition is produced in one order, it causes a negative pulse to be applied to the pulse inverting means of the next higher order. The pulse inverting means produces a positive, carry entry pulse upon the input of the said higher order which acts in the same way as the value entry pulse to effect a step of operation for entering 1 in the higher order.

The carry means includes trigger circuit carry units designated Ku, Kt, and Kh (Figs. 11e and 11f), respectively associated with the units, tens, and hundreds orders of register units. The points 67R of all the carry units are coupled by resistors numered 121 and condensers numbered 122 to a common wire 120. Wire 120 (see Fig. 11g) is connected to the lower end of anode resistor 134 of a pentode 130. The screen of pentode 130 is connected via a wire 32 to the junction of resistors 131 and 132 comprising a voltage divider across lines 50 and 61. Resistor 132 is shunted by a condenser 133 which aids in maintaining the screen voltage constant. The grid of pentode 130 is connected to point 67L of an indicating control trigger circuit unit I. This unit is off when entries are being made during totaling periods; hence its point 67L is then at high potential, substantially equal to that of cathode line 61. Accordingly, the grid of pentode 130, connected to point 67L of unit I, is at zero bias. The suppressor of tube 130 taps a resistor 129, the lower end of which connects to minus line 51. The resistor 129, at its other end, connects via a condenser 128 to a wire 127 (also see Figs. 11d and 11a) which is connected to resistor 91aaa (Fig. 11a). As explained in section 3, positive pulses are continually produced on resistor 91aaa (see Fig. 10—c). These pulses are transmitted by wire 127 and condenser 128 to resistor 129 by which they are applied to the suppressor of tube 130. Since resistor 129 terminates at minus line 51, it normally maintains the suppressor at sufficiently lower than cathode potential to prevent appreciable current flow in the tube 130 regardless of its grid bias. The positive pulses on resistor 129 will increase the current flow in the tube 130 only when its grid bias is zero, as is the case during totaling periods. The tube will then convert the positive pulses on resistor 129 into negative pulses on anode resistor 134. These negative pulses are in phase with the pulses on resistor 91aaa and are graphically shown in line h of Fig. 10. The negative pulses on resistor 134 appear also on the wire 120 and are fed thence through the parallel condenser-resistors 121 and 122 (Figs. 11e and 11f) to the points 67R of carry units Ku, Kt, and Kh. As explained in section 4, a negative pulse applied to point 67R of a unit is effective to turn the unit off. Thus, the negative pulses continually applied to points 67R of units Ku, Kt, and Kh normally maintain these units in off status.

Point 67L of unit Ku (Fig. 11e) is connected by a resistor 119u and condenser 118u to point 67R of unit A0—5 of the first order. Similar connections are provided between point 67L of Rt and point 67R of A0—5 of the tens order, and between point 67L of Rh and point 67R of A0—5 of the hundreds order. When an order of register units is manifesting value 9, the unit A0—5 of the order is on (see Fig. 9) and its point 67R is at high potential. Since the connected point 67L of the related carry unit is normally at high potential, the unit being off, there is no change in status of the carry unit as long as point 67R of A0—5 remains at high potential. When the order of register units progresses from a 9 value manifestation to a 0 value manifestation, its unit A0—5 is turned off (see Fig. 9). When A0—5 is tripped off, there is produced at its point 67R a steep negative pulse (see Fig. 8c) which feeds to point 67L of Ku, triping this unit on. It will be noted from Fig. 10, lines (9) to (1) that the entry control pulses and, therefore, the entry pulses appear at exactly index point times while the pulses on wire 120 appear at mid-index point times (Fig. 10—h). Hence, the entry pulse which turns off unit A0—5, causing Ku to turn on, is followed half an index portion later by a pulse on wire 120 which turns Ku off.

Point 67R of unit Ku is connected by a resistor 123u and condenser 124u to resistor 112t of the pulse inverting means of the tens order. When unit Ku is switched off again, after having been turned on by A0—5, a steep negative pulse is produced at its point 67R (see Fig. 8c) and fed to resistor 112t, causing tube 113t to produce a positive, carry entry pulse on wire 96t. Since Ku is switched off at a mid-index point time, the carry entry pulse appears at such time and effects a step of operation of the register units of the tens order. Since the carry entry pulse appears at mid-index point time while the regular value entry pulses appear at exact index point times, each will be individually effective to produce a step of operation of the resistor units. In other words, the timing relations of the carry and regular value pulses are such that none of the pulses is lost in another pulse.

In the same way as the units order when it exceeds its capacity brings about a carry entry to the tens order, carry will be effected between the other orders.

If the order receiving a carry pulse is then in 9 value status, the carry pulse turns off A0—5 of this order, applying a negative pulse to point 67L of the related carry unit. This action occurs at a mid-index point time simultaneously with application of a pulse on wire 120 to point 67R of the carry unit. As explained in section 4, when negative pulses are simultaneously applied to opposite sides of the trigger circuit unit, only the one for reversing the status of the circuit is effective. The carry unit which is off at the time it receives the two negative pulses simultaneously at opposite sides, one from A0—5 and the other from wire 120, is therefore turned on by the pulse from A0—5. For instance, if the tens order is in 9 status and receives a carry entry from the units order, A0—5 of the tens order turns off and applies a negative pulse to point 67L of Kt at a mid-index point time. Simultaneously, a negative pulse from wire 120 is being applied to point 67R of Kt. Since Kt has been off, only the negative pulse on its point 67L is effective and turns the carry unit on. One full index portion later, another negative pulse from wire 120 turns off Kt, causing a carry entry to be made in the hundreds order. Similarly, if the hundreds order is a 9, the carry entry will turn off its unit A0—5, and through the carry unit Kh, a carry entry will be made a full index portion later into the thousands order. Thus, successive carry operations may occur in the several orders and there is no necessity for special carry through carry means. It may be noted that if two or more of the orders simultaneously are stepped to 0 status, carry pulses are simultaneously produced in their respectively higher orders. For instance, if the units and hundreds order are simultaneously stepped by regular entry pulses to 0 status, the carry units Ku and Kt are turned on simultaneously and half an index portion later are turned off. Accordingly, carry pulses will simultaneously be applied to the tens and the hundreds order.

*Examples of entries.*—It will be assumed that the pulse producing means of Fig. 11d is used and that four entries are to be made. The first three entries are of positive amounts and the fourth entry is of a negative amount. Figs. 12, 13, 14 and 15 show the timing of operations relating to the four successive entries. The register units are indicated by the voltage conditions of their left and right sides or points, 66L, 67L and 66R, 67R, the letters L and R being used to signify the left and right hand sides or points. The top line of the figures represents the status of an elusive one trigger circuit unit E which will be explained later. The lines a show the entry pulses on the input wires. The lines directly below lines a show the status of the carry units. Parts u, t, h, and th refer to the units, tens, hundreds, and thousands orders, respectively. It is assumed the register units of each order are initially off, registering zero before entry of the first chosen amount.

The first amount to be entered is 0405. To select the amount 0405 for entry, the operator depresses keys 138—0, 4, 0, and 5 (Figs. 1 and 2) of the thousands, hundreds, tens, and units orders respectively, thereby closing the associated key contacts 108 (also see Fig. 11d). The operator then depresses the start key 220 (Fig. 3), reversing the switch 95 and causing condenser 94 (Fig. 11a) to discharge a pulse to wire 20. In a manner explained in previous section 5, this results in the switching on of commutator unit T (Fig. 11a). The commutator then performs one cycle during which units C9 to C1 go on in succession. When C5 goes on, the increased potential at its point 67R is transmitted by the now-closed key contacts 108—5 of the units order to the grid of pentode 100u (see Fig. 11d). Hence, five negative entry control pulses appear on resistor 101u at the times shown in line (5) of Fig. 10. These five negative pulses are transmitted to resistor 112u (Fig: 11e). Tube 113u inverts the pulses on resistor 112u into positive entry pulses on input wire 96u, the timing of the five entry pulses being shown in Fig. 12, part u, line a. The first pulse turns on unit A6—1 at "5" (Fig. 12, part u, line b), the second pulse turns on A7—2 at "4" (line c, part u, Fig. 12), and so on until the fifth pulse turns on A0—5 at "1" (line f, part u, Fig. 12). At the end of the cycle, all the register units of the first order are on. Reference to Fig. 9 shows that with all the register units of an order on, digit 5 stands in the order. Thus, as a result of selection of digit 5 for entry in the first order, the register units of this order are operated through five steps during the first cycle, and at the end of the cycle denote the presence of digit 5 in the order.

A significant digit has not been chosen for entry in the tens and thousands orders during the first cycle; hence their register units remain in zero status.

The value 4 has been chosen for entry in the hundreds order. Fig. 12, line a of part h, shows the four entry pulses appearing on wire 96h during the commutator cycle, as a result of the selection of digit 4 for entry in this order. The first pulse turns on A6—1 of the hundreds order at "4," the second pulse turns on A7—2 at "3" and so on. At the end of the cycle, the units A6—1, A7—2, A8—3, and A9—4 have been stepped to on state and the unit A0—5 has remained in off state. With the register units in these conditions, the value 4 is manifested (see Fig. 9).

By the end of the first cycle, the amount 0405 has been entered, and the units order stands at 5, the tens order at 0, the hundreds order at 4, and the thousands order at 0.

Assume that the next amount to be entered is positive amount 1529. Key contacts 108—1, 108—5, 108—2, and 108—9 of the thousands, hundreds, tens and units orders, respectively, are closed. The operator again depresses start key 220 (Fig. 3) initiating a second commutator cycle. The timing of operations relating to the accumulator orders during the second cycle are shown in Fig. 13. In a manner now clear, nine entry pulses appear on wire 96u of the units order at exact index point times, as shown in line a, part u, Fig. 13. The units order was previously manifesting value 5, hence all its register units are on prior to the reception of the first entry pulse at "9" of the second cycle. With A0—5 of the units order on, it is priming A6—1 to turn off. Hence, the first pulse turns off A6—1 at "9" of the second cycle. The next three pulses turn off A7—2, A8—3, and A9—4 in succession and at "6" of the cycle the units order is manifesting value 9. The fifth pulse turns off A0—5, thereby causing the order to pass from a 9 value manifestation to a 0 value manifestation at "5" of the cycle. As A0—5 turns off at "5," it applies a negative pulse to point 67L of carry unit Ku, turning on this unit at this time. Half an index portion later; that is, midway between "5" and "4," the next negative pulse (Fig. 10—h) is applied via wire 120 to point 67R of unit Ku and turns this unit off. As Ku turns off, it transmits a negative pulse to resistor 112t which is inverted by tube 113t into a positive, carry entry pulse on wire 96t. This pulse appears midway between "5" and "4" (see line a, part t, Fig. 13). Since the tens order up to that time is at zero, the carry pulse turns on A6—1 of the tens order, this action occurring between "5" and "4," as shown in line b, part t, of Fig. 13.

Continuing with the operation of the units order from the point where it has been operated by the first five of the nine entry pulses from a 5 to a 0 value manifestation. the sixth, seventh, eighth and ninth pulses turn on A6—1, A7—2, A8—3, and A9—4 successively, the order then manifesting value 4. Thus, the addition of value 9 in the second cycle to the value 5 previously in the units order has advanced this order to a 4 value manifestation and meanwhile has effected a carry to the tens order.

With regard to the tens order, two regular value entry pulses appear on its wire 96t because of the selection of digit 2 for entry in this order. The tens order has already been advanced by the carry pulse to a 1 value manifestation and the two entry pulses which appear at "2" and "1" effect two more steps of operation, at the end of which A6—1, A7—2, and A8—3 are on and A9—4 and A0—5 are off. The order then manifests value 3 (see Fig. 9).

For the hundreds order, value 5 has been chosen for entry. Hence, five regular entry pulses appear on wire 96h and advance the hundreds order from its previous value manifestation of 4 to a manifestation of value 9.

Regarding the thousands order, value 1 has been chosen for entry. One pulse appears at "1" on wire 96th. This order, being previously at zero, the pulse will turn on A6—1. The order then manifests value 1.

At the end of the second commutator cycle, the orders manifest the sum 1934 of the first entered amount 0405 and the second entered amount 1529.

Assume that the amount selected for a third entry is the positive amount 0088. Key contacts 108—0 of the thousands and hundreds orders 108—8 of the tens and units orders are closed. Key 220 (Fig. 3) is again depressed, initiating a third commutator cycle. The timing of operations for the third entry is shown in Fig. 14.

Regarding the units order, previously at 4 value, eight entry pulses appear on wire 96u at the "8" to "1" times. The first six of these pulses advance the order to 0, and such action occurs at "3." Hence, A0—5 turns off at this time and turns on Ku. As Ku turns off half an index position later, it causes a carry pulse to appear on wire 96t midway between "3" and "2" (see Fig.

14, line a, part t). The seventh and eighth pulses advance the units order to value 2 manifestation.

For the tens order, value 8 has been chosen for entry and eight regular value entry pulses appear on wire 96t at the "8" to "1" times. Since this order previously manifested value 3, the first six value entry pulses appearing at the "8," "7," to "3" times advance the manifestation to one of the value 9. Between "3" and "2," the carry pulse, derived from the units order, appears and turns off A0—5 of the tens order (see line f, part t, Fig. 14). Following the appearance of the carry pulse, the two remaining regular value entry pulses appear and advance the tens order to value 2 manifestation.

With regard to the hundreds and thousands orders, no regular value entry pulses appear on their wires 96h and 96th because 0 has been chosen for entry in these orders. However, when the tens order was advanced between "3" and "2" by a carry pulse to a 0 value manifestation, as previously described, its unit A0—5 turned off and thereupon applied a negative pulse to point 67L of the unit Kt. Since this action occurred at a mid-index point time, a negative pulse, fed from wire 120, is also then acting upon point 67R of Kt. Nevertheless, since Kt is off prior to this time, the negative pulse on its point 67L takes effect, for reasons already explained, and turns on Kt midway between "3" and "2." The next negative pulse fed from wire 120 is applied to point 67R of unit Kt one index position interval later, turning Kt off between "2" and "1." Accordingly, a carry pulse is produced at this time on wire 96h (see Fig. 14, line a of part h). Since the units order was previously manifesting value 9, the carry pulse advances it to value 0. Accordingly, A0—5 of the hundreds order turns off between "2" and "1" and trips the unit Kh on. One index position interval later, Kh is tripped off by a negative pulse fed from wire 120, causing a carry pulse to appear on wire 96th between "1" and "0" of the third cycle (see line a, part th, Fig. 14). The thousands previously at value 1 manifestation is advanced to value 2 manifestation.

As a result of the third entry, the accumulator manifests the total 2022.

Carry entries may occur after termination of the cycle at "0." To take an extreme example, assume that the accumulator is manifesting 0998 and that amount 0002 is chosen for entry. Accordingly, during the ensuing commutator cycle, the units order passes at "1" to a 0 value, causing a carry entry pulse to appear on wire 96t between "1" and "0." The carry entry pulse advances the tens order to 0. Hence, a carry entry pulse appears on wire 96h one oscillator cycle after the midpoint between "1" and "0." The carry pulse on wire 96h advances the hundreds order to 0. Accordingly, one oscillator cycle after the appearance of a carry pulse on wire 96h and two oscillator cycles after a carry pulse appeared on wire 96t, there is a carry pulse on wire 96th. The thousands order thereby is advanced one step. Thus, although the commutator cycle has terminated at 0, one or more carry entries may occur subsequently.

Summing up, to enter a positive amount in the accumulator order, the digits of the chosen amount are set up on the keyboard. A commutator cycle is then initiated. During the commutator cycle, a number of regular value entry pulses corresponding to the value of the digit chosen for entry in an order appears on the input of this order of register units. The pulses effect steps of operation of the register units, one step for each pulse, the first step being an operation of that register unit following the last one operated by a previous entry in the order. In each such step, one register unit is switched in status, one of its branches being turned on and its opposite branch being turned off. Consequently, selective combinational codal patterns of on and off states of the units or on and off states of their branches or high and low potentials at their R and L points are produced, each pattern being indicative of a different digit. The last step of operation of the register units of an order produces a combinational pattern indicative of the cumulative value of the digit last entered and the one previously standing in the order. When a lower order exceeds its capacity, it causes carry to be effected to the next higher order.

It may be noted from Fig. 10 that the commutator units C9 to C1 turn on sequentially at definite points of the cycle and then remain on to the end of the cycle. Likewise, value entry pulses produced under control of the C9 to C1 units have definite timing relations to the cycle. Thus, the nine entry pulses for entering value 9 appear at "9," "8" . . . "1" of a cycle (Fig. 13, part u, line a), the eight entry pulses, to enter value 8, appear at "8," "7" . . . "1" of the cycle (see Fig. 14, part u, line a), and so on for the other value entry pulses. It may be noted that the regular value entry pulses upon each input wire of an order start at differential times of the cycle corresponding to the values to be entered and terminate at a common, fixed time; namely, at "1" of the cycle. Thus, each train of value entry pulses is produced for a period of the cycle proportional to the value to be entered and effects a number of stepping operations for such proportional period of the cycle equal to the value to be entered. For instance, if a 7 is to be entered, seven regular value pulses appear, between "7" and "1" of the cycle, effecting seven steps of operation of an order of register units. Carry entry pulses appear on the input wire of an order of register units at times offset with respect to the times at which regular value entry pulses may appear. The carry pulses may appear during a commutator cycle at mid-index point times or, under circumstances previously explained, may appear at similar times after termination of the commutator cycle.

The fourth amount to be entered is the negative amount 0532. The entry of a negative amount entry is effected by entering its complement. As is well understood, the entry of the complement of an amount into an accumulator is mathematically equivalent to subtracting the amount. A correct balance will be given when positive amount are entered as true figures and negative amounts as tens complements. In the present case, the tens complement entry is provided for by entering the nines complement of each digit of an amount into the proper order of the accumulator and additionally entering the elusive one into the units order. The selection of a negative amount is effected by operating key contacts 138 (Figs. 1, 2, and 3) corresponding to the true digits of the amount and also by operating the subtract key 225 (Fig. 4). Operation of key 225 reverses the status of contacts 107. Reference to Fig. 11d shows that with contacts 107—0 to 9 reversed, they are respectively connected to the key contacts 108—9 to 0. Thus, by reversing the contacts

107—0 to 9, nines complementary connections between them and the contacts 108 are closed. The result is that the nines complements of the digits corresponding to the contacts 108 will be read out. The entry of a complement value into an accumulator order will be effected in the same way as a true value. Thus, if key contacts 108—1 of the units order are closed, the same operations of the units order network will be effected as when entering positive value 8 therein. In other words, step by step operation of the register units of the order will be performed for a period of the cycle proportional to the nines complement of the selected negative value, the first operation occurring under control of an entry pulse appearing at the index point time of the cycle corresponding to the nines complementary digit and the last entry pulse appearing at the fixed time "1" of the cycle.

As an example, the amount 0532 is to be subtracted from the total 2022 of the first three entries. The keys 138 for setting up chosen amount 0532 are depressed, closing contacts 108—0, 5, 3, and 2 in the thousands, hundreds, tens, and units orders, respectively (Fig. 11d). The subtract key 225 (Fig. 4) also is depressed, reversing the status of the contacts 107. Accordingly, closed contacts 108—2 (units order) are connected by contacts 107—7 and wire 109—7 to point 67R of commutator unit C7 (Fig. 11a); closed contacts 108—3 (tens order) are connected by contacts 107—6 and wire 109—6 to point 67R of C6. In similar fashion, closed contacts 108—5 (hundreds order) and closed contacts 108—0 (thousands order) are connected, respectively, to points 67R of C4 and C9. After depression of the proper keys 138 and of the subtract key 225, the start key 220 (Fig. 3) is operated, initiating a commutator cycle. During this cycle, when C7 turns on, the increased potential of its point 67R is transmitted via wire 109—7, contacts 107—7, contacts 108—2 (units order), and wire 110u to the grid of tube 100u (Fig. 11d). Accordingly, the (7) pulse train shown in Fig. 10 appears on resistor 101u. Thus, the closure of value key contacts 108—2 in the units order, when subtraction is to be performed during a cycle, results in the production of seven entry control pulses for the units order. It will be noted that the number of these pulses is the nines complement of the value corresponding to the closed value key contacts. Similarly, the closure of contacts 108—3 in the tens order results in the production of the (6) pulse train on resistor 101t, the closure of contacts 108—5 (hundreds order) produces the (4) pulse train on resistor 101h, and the closure of contacts 108—0 (thousands order) produces the (9) pulse train on resistor 101th (Fig. 11d). Each of these pulse trains is inverted by the related order of pulse inverting means into positive value entry pulses on the input wire of the order. Fig. 15 shows the timing of operations relating to the example under discussion. Fig. 15, part u, line a shows the seven value entry pulses on wire 96u and an additional entry pulse appearing midway between "1" and "0" of the cycle. This additional pulse is an elusive one entry pulse produced in a manner explained later. Fig. 15, part t, line a shows the six value entry pulses on wire 96t and a subsequent carry pulse. Fig. 15, lines a of parts h and th show the four and nine value entry pulses appearing on wires 96h and 96th, respectively.

The units order which previously manifested value 2 is advanced by the seven regular entry pulses and the additional elusive one pulse to 0 value status. The tens order, previously manifesting value 2 is advanced by the six regular entry pulses and the additional carry pulse to the manifestation of value 9. The tens order which manifested 0 before is advanced by the four regular entry pulses to a manifestation of value 4. The thousands order is advanced by the nine regular entry pulses from a manifestation of value 2 to a manifestation of value 1. Thus, the addition of the tens complement 9468 of negative amount 0532 to the previous total 2022 produces the manifestation of the balance 1490 by the totalizer orders, this balance being the amount obtained by subtracting 0532 from 2022.

The elusive one means will now be described.

*Elusive one means.*—This means includes a trigger circuit unit designated E (Fig. 11d). Point 67R of unit E is coupled by a wire 33 (also see Fig. 11g), resistor 121e, and condenser 122e to wire 120 upon which negative pulses (Fig. 10—h) continually appear during totaling periods, as previously explained with regard to the carry means. The negative pulses on wire 120 are thus applied to point 67R of unit E, and thereby normally maintaining this unit in off state. When subtraction is being performed, contacts 107e (Fig. 11d) are close, connecting point 67L of unit R1 to a resistor 119e which connects by a condenser 118e and wire 232 to point 67R of control unit T (Fig. 11a) of the commutator. As indicated in Fig. 10 and explained before, unit T is automatically turned off at "1" of the commutator cycle. When T is turned off, a sharp negative pulse is produced on its point 67R of the character shown in Fig. 8c. This negative pulse is applied via wire 232, condenser 118e, resistor 119e, and now-closed contacts 107e to point 67L of unit E. Accordingly, unit E is turned on at "1" of the cycle, as shown in Fig. 15, part u. Half an index position later; i. e., midway between "1" and "0" of the cycle, a negative pulse on wire 120 is fed to point 67R of unit E, turning off this unit. A sharp negative pulse thereupon appears at point 67R of unit E and is fed via wires 33 and 330 (also see Fig. 11e), resistor 123e and condenser 124e to resistor 112u. This negative pulse is inverted by tube 113u and a positive, elusive one entry pulse appears on wire 96u midway between "1" and "0." The elusive one entry pulse effects a step of operation of the register units of the first order. Accordingly, in the assumed example, since the first order has been advanced previously during the fourth commutator cycle to a manifestation of value 9, the elusive one pulse steps the first order to a 0 value manifestation. This action occurs midway between cycle points "1" and "0" and is attended by the switching of A0—5 (units order) to off state. In the manner previously explained, when A0—5 of the units order turns off, it turns carry unit Ku on. One oscillator cycle later, a negative pulse fed from wire 120 turns unit Ku off, producing a negative pulse on resistor 112t which is inverted by tube 113t into a positive, carry entry pulse on wire 96t. This carry pulse is the last one shown in line a of part t, Fig. 15. The tens order which up to then has been advanced to value manifestation 8 is stepped by the carry pulse to value manifestation 9.

The units order now manifests 0, the tens order manifests 9, the hundreds order manifests 4, and the thousands order manifests 1. The amount 1490 standing in the accumulator is the balance obtained by subtracting the last chosen amount 0532 from the previous total 2022.

In this manner, positive and negative amounts are accumulated and their algebraic total manifested by the register units of the several orders of the accumulator. The machine has indicating means which may be placed in operation to provide character indications of the totals. It was assumed thus far that the indicating means was not in operation. It is entirely possible to make any desired number of entries in the accumulator while the indicating means is idle. The indicating means may thereafter be set in operation to provide a visual character indication of the total in the accumulator. On the other hand, it may be desired to provide a character indication of the amount in the accumulator after each entry is made. For this manner of operation, the machine will be set for indicating an entry operation, and each total as it is obtained will be indicated in character outline form by the continually operating indicating means. The indicating means will now be described.

7. *Character indicating means*

The indicating means, per se, includes the cathode ray tubes 150 (see Figs. 1 and 2), one for each order of the accumulator, and a pattern component emitter to determine the patterns traced by the tubes. The patterns to be traced here are digits 0 to 9. The pattern emitter in its general aspects is similar to that disclosed in Patent 2,264,587 to R. I. Roth. The emitter comprises a pattern disk, scanning means therefor, and amplifying means coupled to the scanning means. The pattern disk is designated 40 (Figs. 5, 6, 7, and 11g) and is generally transparent except for two opaque concentric tracks 40X and 40Y. Disk 40 is fixed to a shaft 37 having a belt drive connection 36 to a motor 35. Separate scanning means is used for each track, each scanning means comprising a light source and photocell. Each light source includes a lamp 41, a reflector 43 (Fig. 7), a lens system 44, and an apertured diaphragm 45 in the lens box. Both light sources are in front of the disk, but one is located so as to project a concentrated, thin rectangular beam of light radially across track 40X and the other is located so as to project a similar beam of light radially across a diametrically opposite part of track 40Y. Behind track 40X is a photocell 46X to receive whatever light is not blocked by this track. A photocell 46Y is behind track 40Y to receive the light unintercepted by the latter track. Each track is divided into ten equal segments pertaining to the digits 0 to 9. The corresponding digit segments of both tracks are at diametrically opposite locations on the disk 40, so that the digit segment of track 40X and the corresponding digit segment of track 40Y will travel across their respective scanning means simultaneously, upon rotation of the disk. The tracks are of varying radial widths to permit varying amounts of light to pass to the photocells during rotation of the disk. In a manner made clear later, each track has a component share in controlling the tracing of the digits by the cathode ray tubes 150.

The internal structure of each cathode ray tube 150 is shown in Figs. 11e and 11f. Each tube 150 has an indirectly heated cathode, a grid 152, a No. 1 anode 153, a No. 2 anode 154, pairs of deflection plates XR—XL and YU—YL, and a fluorescent screen 155. The path of an electron stream from the cathode to the screen is determined by the potentials on the deflection plates. When there is no potential difference between the plates of each pair, the electron stream impinges the center of the screen. If plate XL is at positive potential relative to plate XR, the electron stream is deflected to the left in a horizontal direction. If the plate XR is positive in potential with respect to plate XL, the electron stream is deflected horizontally to the right. Similarly, plate YL if positive with respect to plate YU deflects the electron stream downwardly in vertical direction, while if plate YU is positive relative to plate YL, the deflection is upward in vertical direction. The potentials on plates XL and XR and on plate YL and YU when at suitable values will exert component deflection forces upon the electron beam, combining to deflect the beam in a resultant direction to strike a desired point of the screen 155. Further, the potentials between the plates of each pair may be successively varied to constantly deflect the beam to predetermined points of the screen in such manner as to trace a desired character. This is done under control of the pattern emitter tracks 40X and 40Y, as follows:

Referring to Fig. 11g, photocell 46X and a resistor 166X are serially connected between lines 50 and 61. Resistor 166X connects through a condenser 167X to a resistor 168X, terminating at line 61. Resistor 168X is connected to the control grid of a pentode 169X. The cathode of this tube is connected to line 61 by a resistor 170X which is shunted by a condenser 171X. The screen grid of the tube is maintained at substantially steady voltage by connection through a resistor 172X to line 50 and through a condenser 173X to line 61. The suppressor grid of the tube is connected to the cathode. With the above arrangement, current flow in the tube 169X and its anode resistor 174X varies according to its control grid potential.

During each revolution of the disk 40, different radial widths of track 40X pass the scanning means, allowing variable amounts of light to strike the photocell 46X. The impedance of the photocell thereby is varied, so that current flow in resistor 166 also varies. Condenser 167X transmits these variations to resistor 168X which correspondingly affects the control grid potential of tube 169X. Corresponding but amplified changes in current flow through tube 169X and its anode resistor 174X are thereby produced. The anode of tube 169X is coupled by a condenser 175X to a resistor 176X which has its upper end connected to line 54. The junction of resistor 176X and condenser 175X is connected to a wire 177X (also see Figs. 11d, e, and f) from which parallel connections are made to deflection plates XR of all the cathode ray tubes 150. Deflection plates XL are connected to line 54. It will be seen that the changes in current flow through tube 169X produce analogous changes in potential at the junction point of condenser 175X and resistor 176X. These potential changes are transmitted by wire 177X to the plates XR of the cathode ray tubes 150. In this manner, track 40X by varying the amount of light to photocell 46X brings about the changes in potential of the plates XR and, hence, varies the potential between plates XR and XL. The ten digit segments of track 40X are of such configurations that, in each revolution of disk 40, they produce those potential differences between plates XR and XL which exert the horizontal components of deflection forces required in the tracing of the ten digits 0 to 9.

Through similar means, track 40Y produces those potential differences between plates YU and YL required for the vertical components of the deflection forces operating in the tracing of the ten digits. Briefly, the track 40Y varies the amount of light falling upon photocell 46Y. Photocell 46Y varies in impedance, causing variations in current through resistor 166Y (Fig. 11g) which are transmitted by condenser 167Y to resistor 168Y. The control grid of pentode 169Y is connected to resistor 168Y and variations in current flow through this resistor produce amplified variations of current flow through the pentode and its load resistor 174Y. Consequent changes in pontential are produced at the junction of condenser 175Y and resistor 176Y and transmitted by wire 177Y (also see Figs. 11d, e, and f) to the plates YU of all the tubes 150. The plates YL are connected to line 54. Thus, the track 40Y controls the potential differences between plates YU and YL.

Since the companion segments of both tracks 40X and 40Y pertaining to a digit are scanned during the same period, the vertical and horizontal components of deflection force required for the tracing of the complete digit are produced on the deflection plates during such period. The digit segments are so arranged (see Fig. 5) that in each revolution of disk 40, digits 9, 8, 7, 6, 5, 4, 3, 2, 1, and 0 would be traced successively if the stream of electrons from the cathode to the screen were not interrupted. However, as explained later (section 8), the electron stream is interrupted except at such times of the revolutions of disk 40 as the segments pertaining to a selected digit are being scanned. Only the selected digit consequently will be traced in each revolution of disk 40. The speed of disk 40 and the persistence characteristic of the fluorescent screen are such that in successive revolutions of the disk, the repeatedly traced character appears to be stationary on the screen. Such displayed character may be viewed by eye or photographically recorded.

For purposes of the present invention, there are four contact disks 161, 162, 163, and 164 fixed to shaft 37 for common rotation with the emitter disk 40 (see Fig. 6). One revolution of shaft 37 is taken as the measure of an indicating cycle. Each cycle is divided into ten index portions, their starting points being designated 10, 12 ... 7, 8, 9 (see Figs. 16a and 16c). It may be noted that point "10" also marks the end of a preceding cycle as well as the beginning of a new cycle. The electrical features of disks 161, 162, 163, and 164 are indicated in Figs. 16a and 16c. Each contact disk includes a track which is conductive along its entire circumference and may be referred to as the common and designated as the c track of the contact disk. Disk 161 has only the common track. Disk 162 has a second track, a, provided with one contact segment connected to the common c of this disk. Disk 163 has two tracks, a and b, flanking the common track. Each flanking track has one contact segment connected to the common track. Contact disk 164 also has two tracks, a and b, flanking common track c, each flanking track having ten equally spaced contact segments. Individual brushes 160 wipe the several tracks of the contact disks. A contact disk or a track of a contact disk will be referred to as "making" when it is engaging its related brush 160. Further, the connection between the brush of a track and another circuit element may be referred to as a connection between the track and such element.

The indicating apparatus having been described, a description will now be given of the manner in which the machine functions to enter values in the accumulator and indicate the digits of the current totals.

8. Entering and indicating operations

Figure 1:
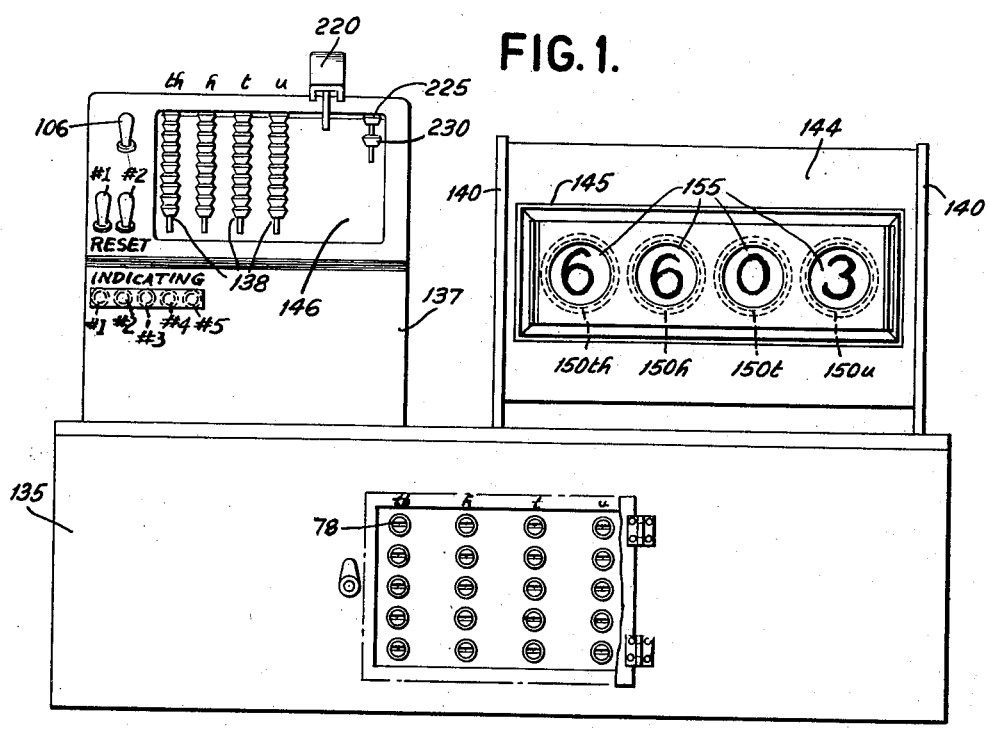
Fig. 1 is an outside, front elevational view of the machine.
Figure 2:
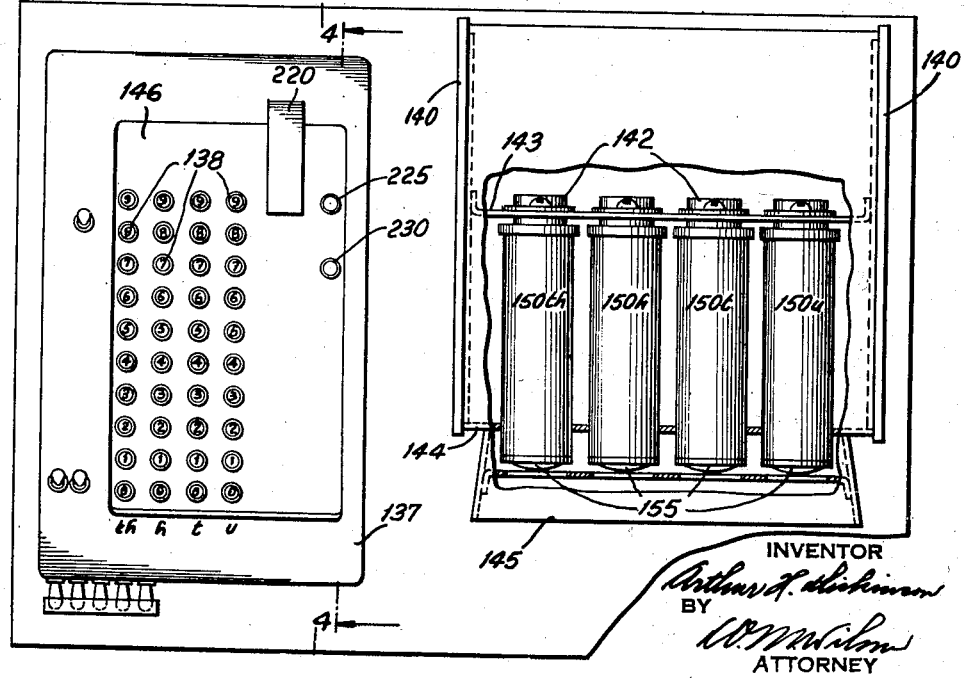
Fig. 2 is an outside plan view of the machine, some parts being broken away.

To set the machine for indicating operation, the operator reverses the switches #1 IND, #2 IND, #3 IND, #4 IND, and #5 IND (Figs. 1 and 2). The #1 IND switch (Fig. 11g) thereby is opened, breaking the connection between wires 20 and 21 and forcing these wires to be connected only through contact disk 162. Accordingly, commutator control unit T can now be turned on, to start a commutator cycle, only at a time determined by contact disk 162.

Switch #2 IND (Fig. 11g) in shown position disconnects unit I from disk 163, permitting this unit to remain off constantly. With switch #2 now in reversed (closed) position, unit I is placed under control of disk 163 to be turned off only during totaling periods, in a manner subsequently explained.

In the reversed (closed) position of switch #3 IND (Fig. 11g), it connects a current source to lamps 41 (also see Fig. 7) of the scanning means for the emitter disk 40. The lamps will thus be continuously lighted when the machine is set for indicating. In the reversed (closed) position of switch #4 (Fig. 11g), it connects a source of power to motor 35 to drive the motor continuously. Switch #5 IND (Fig. 11e) in closed position, connects a source of potential to the heaters of the cathodes in all the tubes 150.

When the machine is not set for indicating, unit T may be turned on at a chance time. Now with the machine set for indicating, unit T will be turned on only at a fixed time of an indicating cycle. When it is desired to make an entry, start key 220 (Fig. 3) is depressed. The position of switch 95 (Fig. 11a) is reversed, conditioning condenser 94 to discharge. When contact disk 162 makes, wires 20 and 21 are connected, enabling the condenser to discharge a positive pulse upon resistor 125 (Fig. 11g). Tube 126a inverts this pulse and the inverted pulse turns on commutator unit T (Fig. 11a), after which the C9 to C1 units go on successively, as previously described in section 5.

Resistor 125 is connected also to the grid of a tube 126b which inverts the positive pulse applied to the resistor by condenser 94, and impresses a negative pulse upon point 66R of unit I. As is now understood, a negative pulse applied to the right side of a trigger circuit unit is capable of turning it off. Unit I is thus turned off simultaneously with unit T being turned on. In section 6, it was explained that unit I must be off during totaling periods in order that negative pulses (Fig. 10—h) appear on wire 120 for elusive one and carry control purposes. The point 67R of unit I is connected to the control grid of a pentode 178 (Fig. 11g). With the unit I in off status, point 67R is at low potential and the control grid of the pentode 178 is at cut-off.

The conditions required for entering the selected amount have now been fulfilled. The entry takes place and, thereafter, unit I is automatically tripped to on status under control of contact disk 163. Reference to Fig. 11g shows that track a of the disk 163 is connected to the junction of resistors 181 and 182 which are in series across lines 50 and 51. Track c of disk 163 is connected through a condenser 183 to line 51. Track *b* of disk 163 is connected by now-closed switch #2 IND to point 67R of unit I. When track 163a makes, it completes a circuit from line 50 through resistor 181, the track 163a, the common track 163c, and condenser 183 to line 51. The condenser is charged to the potential existing across resistor 182. Shortly thereafter, the track 163a breaks and, subsequently, track 163b makes. Thereupon, condenser 183 discharges a positive pulse through track 163c, track 163b, and switch #2 IND, upon point 67R of unit I. The positive pulse is of sufficient amplitude to turn unit I on. Its point 67L is connected by a condenser 185, resistor 184, and wire 230 (also see Fig. 11d) to point 67L of elusive one control unit E. As unit I is turning on, a sharp negative pulse appears at its point 67L (see Fig. 8c) which through the described coupling is transmitted to point 67L of unit E. A negative pulse applied to the left side of a trigger circuit unit turns the unit on; hence unit E is now on. Since point 67L of unit I is now at low potential, the control grid of tube 130 (Fig. 11g) is at cut-off, preventing the tube from producing the negative pulses (Fig. 10—h) which serve for carry and elusive one control purposes during totaling periods. It will be recalled that when a subtractive entry is made, key contacts 107e (Fig. 11d) are closed in order that when unit T turns off at "1" of the commutator cycle (see Fig. 10), it shall apply a negative pulse to the left side of unit E to turn it on. A negative pulse on wire 120 turned unit E off shortly after, with the result that an elusive one entry pulse was produced, all as explained in section 6. Now, with the machine conditioned for indicating, unit E has been turned on after the entry period, but since pulses on wire 120 do not appear, unit E will not be turned off and will not produce an elusive one entry pulse. Thus, after the entry period, unit I is turned on, turns on unit E, and suppresses the production of pulses on wire 120, so that carry and elusive one entry pulses cannot be produced until another totaling period occurs.

Unit I is now on and its point 67R is at high potential. The connected control grid of pentode 178 (Fig. 11g) thereby is increased in potential above cut-off, conditioning this tube to respond to the positive pulses applied to its suppressor by resistor 180.

The resistor 180 is supplied with pulses by a multivibrator oscillator generally designated P in Fig. 11g. This oscillator is similar to the one designated M in Fig. 11a and which was described in section 3. To assist in identifying the functions of elements of oscillator P, they are given the same reference numbers as corresponding elements of oscillator M, but preceded by letter P. Only the square-topped waves produced on resistor P84 are utilized. Resistor P84a is coupled by condenser P88a to resistor P89a. The RC product of the latter two elements is made small so that the square-topped pulses on resistor P84a are converted into steep positive and negative pulses on resistor P89a (compare lines *j* and *k* of Fig. 16a).

Resistor P89a is tapped by the grid of a tube 290. The resistor terminates at cathode line 61 so that the tube is normally at zero bias and is conductive. Positive pulses on resistor P89a, therefore, have no effect, but negative pulses on the resistor periodically cut off the current flow, producing positive pulses on anode resistor 291a. Resistor 180 is coupled by condenser 292 to the anode of tube 290, so that the positive pulses also appear on resistor 180 (see line L, Fig. 16a). These positive pulses are transmitted to the suppressor grid of tube 178. Since unit I is now on and, therefore, the control grid of tube 178 has been raised in potential above cut off, the tube is effective to invert the positive pulses impressed on its suppressor grid. In consequence, negative pulses (line *m*, Fig. 16a) appear on the load resistor 179 and on a wire 189. These pulses are produced only if unit I is on; that is, between totaling periods only. The rate of production of the pulses on wire 189 is determined by the frequency of the oscillator P. The oscillator frequency is adjusted to ten oscillator cycles per indicating cycle and, therefore, the negative pulses on wire 189 will be produced at the same rate after unit I has been turned on. It is required, further, that these negative pulses appear at times having fixed relations to the times at which different points of the contact disks and the emitter disk on shaft 37 reach operating positions. Since the duration of one revolution of shaft 37 is the measure of an indicating cycle, it may be stated that the negative pulses on wire 189; hence, the oscillator P pulses, are required to be in fixed time relations within the indicating cycle. Thus, oscillator P, besides being adjusted to the required frequency must also be in predetermined synchronism with the operation of shaft 37 and the elements on the shaft. The oscillator is synchronized under control of contact disk 164 (Fig. 11g). Track *a* of disk 164 is connected to the junction of resistors 186 and 187 which are in series between lines 50 and 51 (see Fig. 11g). The common *c* of disk 164 is connected by a condenser 188 to line 51. The track *b* of disk 164 is connected to a point of grid leak resistor P86a of oscillator P. Track *a* of disk 164 makes and breaks in each index portion of an indicating cycle, each time charging up condenser 188. Track *b* of disk 164 makes and breaks once within each open interval of track 164a, each time discharging a positive impulse from condenser 188 upon resistor P86a. At the time tube P83a is at cut-off, the negative charge on condenser P85a leaks off through resistor P86a. The positive pulse from condenser 188 effects completion of the leakage action, and tube P83a instantly starts to conduct. Thus, the disk 164 controls the production of synchronizing pulses for the oscillator P. It will be evident from line *g*, Fig. 16a, that condenser 188 is charged and discharged ten times each indicating cycle, assuring the production of the oscillator pulses (see Fig. 16a, line *j*) at ten predetermined times in such cycle. Accordingly, the pulses on resistors P89 and 180 and on wire 189 are produced at the exact cyclic times shown in lines *k*, L, and *m* of Figs. 16a and 16c.

The manner in which negative pulses (Fig. 16a, line *m*) are produced on wire 189 (Fig. 11g) between totaling periods has already been explained in this section. These negative pulses are transmitted to the pulse inverting means of all the accumulator orders simultaneously. For this purpose, wire 189 (see also Figs. 11d, e, and f) is connected to parallel condensers 191u, 191t, 191h, and 191th. Condensers 191u, t, h, and th are respectively connected to line 50 by resistors 190u, t, h, and th. These respective resistors are coupled by associated condensers 192u, t, h, and th to resistors 112u, t, h, and th. Thus, each negative pulse on wire 189 is transmitted to all the resistors 112u, t, h, and th and inverted by tubes 113*u*, *t*, *h*, and *th* into an entry pulse on input wires 96*u*, *t*, *h*, and *th*. Each entry pulse on the input wire of an order effects one step of advance of the value status of the register units of the order. Ten negative pulses appear on wire 189 in each indicating cycle except the one directly preceding a totaling period. As explained before, a totaling period is initiated, after start key 220 has been operated, under control of contact disk 162. The contact disk makes just prior to "10" which marks the end of one cycle and the beginning of the next cycle (see lines *c*, Figs. 16*a* and 16*c*). Thus, if the start key has been depressed, condenser 94 will discharge a pulse on resistor 125 just prior to "10" (see Fig. 16*a*, line *d*). The pulse on resistor 125 starts the commutator cycle (also the totaling period) and simultaneously acts through tube 126*b* (Fig. 11*g*) to turn off unit I. This occurs just prior to the appearance of the positive pulse on resistor 180 at "10" (compare parts *f* and L of Figs. 16*a* and 16*c*). When unit I is off, it maintains the control grid of tube 178 (Fig. 11*g*) at cut-off potential, so that a positive pulse on wire 180 applied to the suppressor of this tube will then have no effect. Accordingly, since unit I turned off just prior to "10" of the indicating cycle directly preceding the totaling period, the pulse on wire 180 at "10" does not produce a negative pulse on wire 189 (see lines *m* of Figs. 16*a* and 16*c*). Hence, only nine negative pulses appear on wire 189 in the cycle directly preceding the totaling period and only nine resulting entry pulses appear on each input wire of the accumulator during such cycle. A tenth entry pulse invariably is produced during the ensuing entry period under control of the elusive one and carry means, as will be described later on. In each indicating cycle, except the one preceding the totaling period, ten entry pulses are produced under control of the pulses on wire 189.

Each entry pulse on the input wire of an order advances the register units of the order by one value step. If an order of register units is in 9 value status at the beginning of an indicating cycle, the entry pulse derived from the negative pulse appearing on wire 189 at "1" advances the order of units to 0 status. It remains in this status until "2" of the cycle. If an order of register units is in 8 value status, two entry pulses bring it to 0 status at "2" of the cycle, and it remains in this status until "3." It is seen that the order is brought to 0 status at points of the indicating cycle which bear a tens complementary relation to the initial value status of the order. By reason of the synchronization of the oscillator with the rotation of shaft 37, the segments of disk 40 may be made to pass their scanning means in predetermined time relation to the stepping of the orders of register units during the indicating cycle. The times in which the segments pertaining to different digits are being scanned is indicated in lines *h*, parts *u*, *t*, *h*, and *th* of Figs. 16*a* to 16*d*, the light characters indicating the segments pertaining to digits not being traced and displayed, and the heavy characters indicating the segment pertaining to the digits being traced. It will be noted that the times at which the different digit segments are scanned are in tens complementary relation to the index positions of the cycle. For instance, the 9 digit segments are scanned in the "1" index portion (i. e., between "1" and "2"). It has been pointed out that the accumulator orders reach 0 value status also at tens complementary times to the values standing initially in the orders. Thus, there is a correspondence of time between the scanning of the digit segments and the values standing initially in the orders. For instance, if an order is initially in 7 status, it is brought to 0 status at "3" at which time the digit 7 segments start to pass their scanning means. The order will remain in 0 status until "4" and in the interim, the digit 7 segments will be completely scanned. When the order attains 0 status in the indicating cycle, it controls the associated cathode ray tube 150 to display the digit relating to the segments then passing their scanning means. Thus, the order initially in 7 value status will be in 0 status between "3" and "4" and, in the interim, the digit 7 segments will be scanned and the digit 7 will be traced and displayed by the cathode ray tube.

The manner in which the 0 status of an order of register units permits the associated tube 150 to trace and display a digit will now be described with reference to the units order (Figs. 11*b* and 11*f*.) It will be understood that the other orders operate similarly in controlling their associated tubes 150.

Point 66L of A0—5 (Fig. 11*e*) of the units order is connected to a resistor 193*u* which terminates at line 51. Resistor 193 is connected to grid 152 of tube 150*u*. If A0—5 is on, point 66L is low in potential and the grid bias of tube 150*u* is at cut-off. If A0—5 is off, point 66L is high in potential, and the grid of the tube 150*u* is above cut-off potential. Point 66L of A6—1 (Fig. 11*b*) of the units order is connected to a resistor 194*u* which terminates at line 61. A wire 38 (also see Fig. 11*e*) connects resistor 194 to anode element 153 of tube 150*u*. When A6—1 is on, point 66L is at low potential, and the potential difference between the anode 153 and the cathode line 61 is too small to permit electrons to pass to the screen 155. When A6—1 is off, point 66L is at high potential and the anode 153 is sufficiently positive with respect to cathode to permit an electron stream to flow to the screen, but such stream will not be produced unless at the same time the grid potential also is above cut-off. When the grid potential is at cut-off, the electron stream will not be produced even though the potential of anode 153 is at its higher value. When the grid potential is above cut-off, the electron stream will not pass to the screen if the potential of anode 153 is at its lower value. Only when the anode 153 and the grid 152 are both at their high potentials will the electron stream be produced and impinge on the screen. These conditions are fulfilled only when units A0—5 and A6—1 both are simultaneously in off state. The units A0—5 and A6—1 are simultaneously in off state when the order is in 0 value status and in no other value status of the order (see Fig. 9). Consequently, the electron stream will impinge the screen 155 of a tube 150 only when the related order of register units is in 0 value status. During an indicating cycle, the order will attain 0 status at a time in which the track segments pertaining to the digit initially in the order are being scanned. Consequently, the deflecting potentials for tracing this digit on the tube screen 155 will be produced during the time in which an electron stream is allowed to impinge the screen. At no other time in the indicating cycle is the electron stream allowed to impinge the screen. Hence, only the digit initially standing in the totalizer will be displayed by the related order of cathode ray tube during the indicating cycle.

In further explanation, assume the selected entries discussed in section 6 with reference to Figs. 12 to 15 are to be made with the machine set for indicating. Prior to the first entry, the amount standing in the totalizer is zero and in each indicating cycle, except the one directly preceding the first entry, the orders are operated by the ten pulses derived from wire 189 (see Fig. 16a, line m) through a value cycle, returning to zero at the end of the indicating cycle. In the indicating cycle directly preceding the first entry, the start key 220 (Fig. 3) is depressed (also see Fig. 16a, line b), preparing the condenser 94 (Fig. 11a) to discharge. When contact track 162a makes just before the end of the indicating cycle, it connects wires 20 and 21 (Figs. 11a, 11d, and 11g) and with the condenser now set to discharge, it produces a positive pulse on resistor 125 (Fig. 11g) just before the end of the indicating cycle (see Fig. 16a, line d). The pulse acts through tube 126a and wire 22 to turn on unit T (Fig. 11a), starting the commutator cycle and the totaling period. Moreover, the pulse on resistor 125 acts upon tube 126b (Fig. 11g) to turn off unit I just before the end of the indicating cycle (see Fig. 16a, part f). With unit I off, it reduces the grid potential of tube 178 so that the pulse fed from resistor 180 at the end of the indicating cycle; i. e., at "10" (see Fig. 16a, line L) to the suppressor of the tube is ineffective, and the tube does not produce a pulse on wire 189 at the "10" time. Thus, during the indicating cycle preceding the totaling period, only nine negative pulses appear on wire 189 and, consequently, only nine entry pulses are produced for each order. Accordingly, in the cycle preceding the first entry, each order is stepped from 0 value status to 9 value status, as may be understood from Figs. 16a and 16c, parts u, t, h, and th, which relate to the different orders.

When unit I was turned off, it raised the grid voltage of tube 130 (Fig. 11g) so that the negative pulses on wire 120 (Fig. 10—h) will appear during the totaling period. As described previously, when unit I was turned on under control of disk 163, the negative pulse appearing at its point 67L was fed via resistor 184 and wire 230 to point 67L of unit E (Fig. 11d), turning on this unit. Now, to start the totaling period, unit I has been turned off, permitting tube 130 to produce the negative pulses on wire 120. The first such pulse following the start of the entry period feeds via condenser 122e, resistor 121e, and wire 33 to point 67R of unit E, turning the unit off. When unit E turns off, the negative pulse at its point 67R feeds via wires 33 and 330 (also see Figs. 11g, 11d, and 11e) and through resistor 123e and condenser 124e to resistor 112u, as described in section 6 for the elusive one entry. Tube 113u converts the negative pulse fed to resistor 112u from unit E into an entry pulse on wire 96u. Thus, the units order of the totalizer is advanced one step immediately after the totaling period starts. Prior to the first totaling period, the units order was advanced to a 9 value status. The additional step of advance effected under control of unit E after start of the totaling period, advances the units order to 0 status. At some time during the indicating cycles preceding the first totaling period, each order of the totalizer has progressed from 9 to 0 status, so that carry units Ku, Kt, and Kh have been turned on. Since negative pulses on wire 120 are not produced during the indicating periods, the carry units remain on. Then, when a totaling period starts, the negative pulses appear on wire 120 and turn off the carry units, causing a carry entry to be made from the units to the tens order, from the tens to the hundreds order, and from the hundreds to the thousands order. In this manner, by reason of the turning off of units E, Ku, Kt, and Kh at the start of the totaling period, each order receives one step of advance, compensating for the omission of one such step during the indicating cycle immediately preceding the totaling period. Thus, with zero standing in the orders prior to the first totaling period, nine steps of advance of each order are effected in the indicating cycle preceding the totaling period. At the start of the totaling period, the orders therefore stand at 9999. After the start of the totaling period, a negative pulse on wire 120 turns off unit E, entering one in the units order, thereby advancing it to 0. As the units order advances to zero, it applies a negative pulse to point 67L of Ku (Fig. 11e), but simultaneously the same negative pulse on wire 120 which advanced the units order to 0 is applied to point 67R of Ku. When two negative pulses act simultaneously upon opposite sides of the trigger circuit, only the one for reversing its status is effective, as explained in section 4. Hence, Ku which is on when it receives the two negative pulses simultaneously at its opposite sides is turned off. Thus, in the particular case under discussion, the fact that the units order is advanced from 9 to 0 under control of unit E after start of the totaling period does not cause unit Ku to be turned on.

It is understood now that in each indicating cycle preceding any totaling period, nine steps of advance are effected of each order and in the ensuing totaling period, a compensating one is added to each order as a result of operation of the units E, Ku, Kt, and Kh.

The first amount chosen for entry is positive amount 0405. This first entry is effected in the first totaling period in the manner described in section 6 with reference to Fig. 12. During the totaling period, track 163a makes (see line e of Fig. 16a) and the condenser 183 (Fig. 11g) is charged. Just before "1" of the indicating cycle, track 163b makes and the condenser 183 discharges a positive pulse to point 67R of unit I, turning it on. This terminates the totaling period.

Attention is directed to the fact that the accumulator operates at great speed in comparison to the speed of operation of shaft 37. The maximum amount may be entered here in slightly less than one index portion of the indicating cycle, i. e., in the interval between the making of track 162a and the making of track 163b. However, the entry period may be lengthened if desired to just short of two index portions of an indicating cycle by advancing the "make" time of contact disk 162 to a time slightly after "9" of the cycle; that is, to a time immediately after the appearance at "9" of a pulse on resistor 180. The sole consideration is that unit I should be turned off before the "10" pulse appears on resistor 180 and should be turned on again before the "1" pulse in the next indicating cycle appears on this resistor, so that only one negative pulse on wire 189 (see line m of Fig. 16a) shall be omitted. The entry periods, whether of the duration shown or of a duration slightly less than two index portions of an indicating cycle, are a small fraction of an indicating cycle, which itself is extremely brief, so that it may be said that entries are made practically instantaneously.

At the end of the first totaling period, the units order is in value 5 status, the tens order is in value 0 status, the hundreds order is in value 4 status, and the thousands order is in value 0 status. Unit I was turned on to terminate the entry period, thereby turning on unit E, suppressing the production of pulses on wire 120, and permitting the production of pulses on wire 189. The pulses on wire 189 control the production of entry pulses on the inputs of all the orders. The units order is advanced by five such pulses to 0 status at "5" following the first entry period, so that tube 150u is conditioned between "5" and "6" for tracing and displaying digit 5 under control of the digit 5 segments of tracks 40X and 40Y which are being scanned during this interval. Similarly, digit 0 is displayed by tube 150t, digit 4 is displayed by tube 150h, and digit 0 is displayed by tube 150th. Thus, the first amount in the totalizer; namely, 0405, is indicated by the tubes 150 after the first totaling period.

Even though the cathode ray tubes display different digits at different times on the indicating cycle, such display appears to be made not only simultaneously but continuously. This is because one indicating cycle occurs in less than 1/15 of a second, below which speed flicker would be noticeable, and because of the persistence characteristics of the fluorescent screens of the tubes 150. Display of the digits standing in the respective orders of the totalizer occurs cycle after cycle until a new entry is made. This is to be understood despite the fact that Figs. 16a to 16d show, for convenience, only two cycles between the first and second entry and only one cycle between the other entries. Actually, owing to the speed of the indicating means, many cycles elapse between one entry and a succeeding one.

It may be mentioned that the production of only nine pulses on wire 189 during the cycle immediately preceding a totaling period is deliberate and not accidental. Had each order received an entry of 10 during such cycle, the further entry of 1 in each order which necessarily results from the tripping off of the elusive one control unit E and the carry control units Ku, t, and h when the totaling period starts, would cause each order to manifest an amount each of whose digits would be one too high. Thus, to compensate for the action of the carry means and the elusive one means when an entry period is started, it is necessary to add 9 rather than 10 in each order during the indicating cycle immediately preceding the entry period.

The second amount to be entered is positive amount 1529. The second totaling period is started in the manner now understood, and the totalizer stands at 1934 at the end of this period. This cumulative amount is now indicated by the cathode ray tubes 150, as shown in Figs. 16c and 16d. Thereafter, the third amount; namely, positive amount 0088 is entered in the third totaling period. The totalizer then manifests 2022 which is indicated by tubes 150 in the ensuing indicating cycles until the fourth totaling period is started. The fourth entry is the negative amount 0532 and its true complement is entered in the manner explained in section 6. At the end of this entry, the indicating means displays the true balance 1490, as shown in Figs. 16c and 16d.

The foregoing has described the details of construction and operation of the indicating means employed for visually indicating the digits standing in the electronic accumulator. Attention is directed to the fact that the register units of all the orders are stepped continuously during indicating. Such action occurs at a given rate of speed. Superimposed upon said continuous operation is a further operation, that of selected entry, and this occurs at a higher rate of speed. It was also explained how certain of the digit manifesting units in each order directly control the cathode ray tube associated therewith without the use of intermediate and supplementary vacuum tubes and related circuits. It was pointed out that the display of any digit is on a timed basis, the time of display being determined by arbitrary voltage conditions which occur once only during each indicating cycle. It was further explained that the time in an indicating cycle that the arbitrary voltage conditions are obtained is determined by the digit standing in a given order. The methods of zeroizing the electronic accumulator prior to making a new series of entries therein, when non-indicating and indicating, and prior to any operation of the device are now explained.

9. Resetting

The resetting operation in the present application, when non-indicating, is performed in two steps and in all orders. The first step trips off all right hand portions of the register units and the second trips off certain right hand portions which may become turned on as a result of a condition arising out of the initial tripping off process. The result of such resetting is such that the final on and off status or pattern of all portions of the register units in each order indicate that -0- stands therein.

Referring to Fig. 11a, resistors 195 and 196 form a voltage divider wired between lines 50 and 51. The junction between 195 and 196 connects via switch #1 Reset, in the position shown, to one plate of condenser 197, whose other plate is connected to line 51. With switch #1 Reset in the position shown, condenser 197 is charged to the potential across 196.

To effect reset, the operator throws switch #1 Reset to a reverse position from that shown, and condenser 197 thereupon discharges in a circuit which includes resistor 198, which terminates at line 80. The grid of each of tubes 199a, 199b and 199c is connected to resistor 198. The cathodes of said tubes are connected to line 61, and the anodes of the respective tubes are connected to line 50 through resistors 200a, 200b and 200c, respectively. Since resistor 198 terminates at line 80, the normal negative grid bias of tubes 199a, 199b and 199c is the potential difference between lines 61 and 80 and is sufficient to maintain said tubes at cut-off.

The discharge of condenser 197 through resistor 198 is in the form of a sharp positive pulse, which reduces the negative grid bias of tubes 199a, 199b and 199c, and increased current flow occurs through said tubes simultaneously. Such current flow causes a negative pulse to be produced on each of resistors 200a, 200b and 200c simultaneously. The negative pulse on 200a is applied to wire 201a (see also Figs. 11b and 11e). Condensers 202 and resistors 203 couple the points 67R of units A6—1 to A0—5 of the units and tens orders to wire 201a. By this circuit arrangement, the negative pulse appearing on wire 201a is simultaneously applied to the right sides of all the register units of these two orders. Thus, any of said register units which are on are now tripped off concurrently.

If any of the digits -5- to -9-, inclusive, stand, for example, in the units order, A0—5 is on and is tripped off by the resetting pulse. Such action results in the tripping on of unit Ku, which trips off subsequently under control of a negative pulse on wire 120. Such tripping off of unit Ku results in a carry to the tens order, subsequent to the tripping off of all the register units of the tens order by the initial resetting pulse. The result of the carry entry in the tens order is to trip on A6—1 of this order. Accordingly, the operator completes the resetting operation by allowing the #1 Reset switch (Fig. 11a) to return to the position shown and then reversing this switch once more. Such action results in the application of a second resetting pulse to wire 201a in the manner explained above, which is effective now to trip off A6—1 of the tens order. It will be appreciated that the aforementioned condition, which requires the application of a second reset pulse to the tens order, also applies to the higher orders. A negative pulse produced on resistor 200b (Fig. 11a) is applied to wire 201b (also see Figs. 11b, 11c, and 11f) to thereby cause resetting of the register units of the hundreds order in a manner described above in connection with the units order. A negative pulse produced on resistor 200c (Fig. 11a) is applied to wire 201c (also see Figs. 11b, c, and f) and fed to the right hand element portions of the thousands order to zeroize the same in a manner now understood.

When it is desired to zeroize the accumulator and the machine is set for indicating, an additional step to effect resetting is necessary. As is now understood, the register units are continually operated when the machine is set for indicating. It is necessary, therefore, to suspend such continuous operation prior to and during the resetting operation. Accordingly, before the operator depresses switch #1 Reset (Fig. 11a), the #2 Reset switch (Fig. 11g) is closed, connecting point 67R of unit I through resistor 204 to line 51. As a result, resistor 64R of unit I is placed in parallel with resistor 204. Accordingly, the potential at point 67R of unit I is reduced sufficiently to cause the unit to trip off. With unit I off, no pulses appear on wire 189 (see Fig. 11g), as explained in section 8, and the resister units are not advanced. Thereafter, the operator reverses the position of switch #1 Reset twice, zeroizing all the orders in the manner already explained in this section. The operator now reopens switch #2 Reset, and unit I is tripped on upon the first application of a positive pulse, derived from condenser 183, to point 67R of this unit, as explained in section 8. Indicating is resumed and the amount -0000- is displayed by the cathode ray tubes.

The foregoing has described the method and means for resetting the electronic totalizer of this invention, so that the quantity -0000- stands therein, and it is seen that the resetting operation is effected without regard to any cyclical machine timing, and that the time required for reset to be accomplished is not dependent upon the value of the digits standing in the accumulator.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a network of electronic trigger circuits for progressively registering different digits in response to pulses received by the network, means acting during a manifesting cycle to apply said pulses to the network to operate the trigger circuits for progressively registering the digits, starting from the digit registered at the beginning of the cycle, whereby a chosen digit is registered at a variable time in the cycle depending upon its relation to the starting digit, and digit manifesting means, including means rendering manifestations of the different digits available in progressive order during the cycle always starting with a predetermined digit manifestation available at the beginning of the cycle, and means controlled by the network upon the trigger circuits registering the aforesaid chosen digit for realizing the digit manifestation rendered available at the time the chosen digit is registered.

2. In combination, a network of electronic trigger circuits operable by pulses upon the network to sequentially register successive digits of a notation during a manifesting cycle, starting from any of the digits, whereby a chosen digit will be registered at a variable time in the cycle depending upon the starting digit, means to apply the pulses to the network to effect repeat cycles of sequential digit registration, and digit manifesting means, including cyclic means operating in synchronism with the trigger circuits to render the digits available for manifestation in predetermined order during each cycle, and means controlled by the network each cycle upon producing the aforesaid chosen digit registration for repeatedly realizing the manifestation of the digit available for manifestation concurrently with repeat registration of the chosen digit during the repeat cycles.

3. In combination, electronic discharge means to produce electrical representations of different digits, a pattern emitter having different digit tracing control portions, cyclic means to present the different digit portions of the emitter in control at successive stages of an idicating cycle, means for altering the status of the electronic discharge means during the cycle to sequentially produce the different digit representations at successive stages of the cycle, and a cathode ray tube controlled by said electronic discharge means upon producing a chosen digit representation and further controlled by the digit portion of the emitter in control at the stage of the cycle at which the chosen digit representation is produced for tracing the digit corresponding to the latter emitter portion.

4. The combination as defined in claim 3, said electronic discharge means comprising a chain of electronic trigger circuits triggered by electrical pulses to produce the digit representations, and said means for altering the status of the electronic discharge means comprising means to produce the triggering pulses in synchronism with the presentation of the different digit portions of the emitter in control of the tube.

5. The combination as defined in claim 3, the chosen digit representation being produced at a variable stage of the cycle dependent upon different starting digit representations, whereby a different digit emitter portion is in control as the chosen representation is produced at a variable stage of the cycle, so that different digits are correspondingly traced by the tube.

6. In combination, a register order comprising a group of electronic trigger devices and a circuit network coupling them for interdependent operation in successive steps through a value registering cycle in response to triggering pulses applied to the network, means for applying the triggering pulses to the network to effect such value registering cycle starting from an initially registered digit and returning to the latter digit after stepping through a limit digit registration, selective digit manifesting means, and circuit means rendered effectve by said network upon the trigger devices stepping to said limit digit registration for enabling the digit manifesting means to manifest a digit dependent upon the initially registered digit.

7. In combination a register order comprised of an array of electronic trigger circuits to selectively register any of different digits at the start of a readout cycle and having a common pulse input, a circuit network coupling the trigger circuits for interdependent operation in response to successive triggering pulses upon said common input, and means to read out the digit registered at the start of the cycle including cyclic means operating during the readout cycle for applying successive triggering pulses to said input to effect differentially timed steps of digit registering advance of the trigger circuits, from the digit registered at the start of the readout cycle and back to this same digit registration at the end of the cycle, whereby the stepping of the trigger circuits to a zero digit registration occurs at a differential time of a cycle dependent on the initially registered digit, selective digit manifesting means including an electronic tube and circuit means operated by said array of trigger circuits upon their stepping to the zero digit registration for producing a change in electronic flow in said tube at a differential time idicative of the initially registered digit.

8. In combination, electronic amount totalizing means including electronic discharge means in each order alterable in electronic status to selectively produce electrical representations of different digits, means to enter a selected amount in the totalizing means by altering the electronic status of the discharge means so as to change the electrical representations according to the digits of the entered amount and including means controlled by an order of discharge means when its capacity is exceeded for effecting alteration in electronic status of the next order of discharge means to produce a carry entry therein, means operating after entry of the selected amount for effecting a cycle of alteration in the status of the discharge means of each order such as to produce each digit representation in turn starting from and returning to the total digit representation, means controlled by the orders of discharge means during such cycle of alteration to manifest the total standing in the totalizing means, and means to suppress carry entries during said cycles of alteration of the discharge means.

9. In combination, a totalizer including means in each order to selectively register the different values of a notation, cyclic means normally to effect cyclic entry of the base value of the notation in each order during each of successive cycles, total manifesting means operated under control of each of the totalizer orders during each said cycle, as it registers a particular value, to manifest the total standing in the totalizer, devices conditioned during said cycles in readiness to enter one in each order during a subsequent totalizing period, means for initiating a totalizing period, means for effecting operation of the conditioned devices during such totalizing period to enter one in each order, means for entering a desired value in the totalizer during the totalizing period, and means for reducing by one the cyclic entry made in each order by said cyclic means during the cycle preceding the totalizing period to compensate for the entry of one made in the totalizing period by operation of the conditioned devices.

10. A circuit network for selectively assuming different conditions and including a plurality of portions at high voltage when the circuit network is in chosen condition, in combination with a cathode ray tube including a cathode, a screen, and a plurality of control electrodes, each effective at low voltage to block the flow of electrons from cathode to screen and the plurality of electrodes, when simultaneously at high voltage, allowing impingement of the electrons on the screen so as to produce a desired trace, and means electrically coupling each of said portions of the circuit to a different one of said control electrodes to apply high voltage to said electrodes simultaneously only when the circuit network is in chosen condition.

11. A circuit network for selectively assuming different conditions and including a plurality of portions at high voltage when the circuit is in chosen condition, in combination with a cathode ray tube including a cathode, a screen, trace shaping means, and a plurality of control electrodes, each effective at low voltage to block the flow of electrons from cathode to screen and the plurality of electrodes, when simultaneously at high voltage, allowing impingement of the electrons on the screen so as to produce a desired trace under control of the trace shaping means, and means electrically coupling each of said portions of the circuit to a different one of said control electrodes to apply high voltage to said electrodes simultaneously only when the circuit network is in chosen condition.

12. A circuit network to sequentially assume different electrical conditions and being in any one of said conditions at the start of a chosen cycle, cyclically controlled means for operating the network during such cycle to produce said electrical conditions sequentially at successive stages of the cycle, whereby a chosen condition is produced at a variable stage of the cycle dependent upon the starting condition, in combination with a cathode ray tube including a trace displaying screen and control means normally preventing impingement of electrons on the screen, means so coupling the circuit network to the control means as to energize the control means, when the network is in the chosen condition, for allowing impingement of electrons, on the screen, trace shaping means having a plurality of different control portions for respectively determining different trace shapes to be produced on the screen, and cyclic means for rendering the different control portions sequentially effective at successive stages of said cycle, whereby the screen traces a configuration determined by the portion of the trace shaping means which is in effect during the stage of the cycle when the chosen condition of said network prevails and allows impingement of electrons on the screen.

13. In combination, a register order composed of a circuit network of electronic trigger devices, each of which is operable to either of two, alternative electrical states, said devices according to their states selectively registering any of different digits at the start of a readout cycle and being interdependently switchable in status in response to successive pulses applied to an input circuit of said network so as to progress in digit registration from the starting digit, and means to readout said starting digit including cyclic means operating during the readout cycle for applying successive triggering pulses to said input to effect differentially timed steps of digit registering advance of the trigger circuits, from the digit registered at the start of the readout cycle and at least to a limit digit registration, whereby the stepping of the trigger circuits to the limit digit registration occurs at a differential time of the cycle dependent on the initially registered digit, and selective digit manifesting means including an electronic tube and circuit means operated by said network of trigger circuits upon their stepping to the limit digit registration for producing a change in electronic flow in said tube at a differential time indicative of the initially registered digit.

ARTHUR H. DICKINSON.

REFERENCES CITED

The following references are of record in the file of this patent:

UNITED STATES PATENTS

| Number | Name | Date |
|---|---|---|
| 2,264,587 | Roth | Dec. 2, 1941 |
| 2,264,623 | Dickinson | Dec. 2, 1941 |
| 2,267,812 | Bryce | Dec. 30, 1941 |
| 2,267,827 | Hubbard | Dec. 30, 1941 |
| 2,281,350 | Bryce | Apr. 28, 1942 |
| 2,315,456 | Schimpf | Mar. 30, 1943 |
| 2,320,337 | Bryce | June 1, 1943 |
| 2,363,941 | Busignies | Nov. 28, 1944 |
| 2,373,134 | Massoneau | Apr. 10, 1945 |
| 2,402,989 | Dickinson | July 2, 1946 |

FOREIGN PATENTS

| Number | Country | Date |
|---|---|---|
| 542,927 | Great Britain | Feb. 3, 1942 |